US010390376B2

(12) United States Patent
Kawaguchi et al.

(10) Patent No.: US 10,390,376 B2
(45) Date of Patent: Aug. 20, 2019

(54) COMMUNICATIONS SYSTEM

(71) Applicant: NEC Corporation, Minato-ku, Tokyo (JP)

(72) Inventors: Kenji Kawaguchi, London (GB); Sivapathalingham Sivavakeesar, Milton Keyes (GB)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/001,169

(22) Filed: Jun. 6, 2018

(65) Prior Publication Data
US 2018/0343691 A1   Nov. 29, 2018

Related U.S. Application Data

(63) Continuation of application No. 14/893,173, filed as application No. PCT/JP2014/063630 on May 16, 2014, now Pat. No. 10,004,103.

(30) Foreign Application Priority Data

Jun. 4, 2013 (GB) .................................. 1309970.0

(51) Int. Cl.
*H04W 48/20* (2009.01)
*H04W 24/02* (2009.01)
(Continued)

(52) U.S. Cl.
CPC ............ *H04W 76/11* (2018.02); *H04W 24/02* (2013.01); *H04W 48/20* (2013.01); *H04W 36/04* (2013.01);
(Continued)

(58) Field of Classification Search
CPC ...... H04W 76/11; H04W 48/10; H04W 24/02; H04W 92/10; H04W 92/20; H04W 88/16; H04W 36/04
See application file for complete search history.

(56) References Cited

U.S. PATENT DOCUMENTS

2011/0269464 A1   11/2011   Xu
2011/0269471 A1   11/2011   Gao
(Continued)

FOREIGN PATENT DOCUMENTS

WO   2011/139096 A2   11/2011
WO   2011/139112 A2   11/2011
(Continued)

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 11), 3GPP TS 36.300 V115.0, Mar. 2013, Cited in the Specification.
(Continued)

*Primary Examiner* — Brian D Nguyen

(57) ABSTRACT

A communication system is disclosed comprising an X2 gateway, a number of base stations, and a mobile device. The base stations are able to establish X2 connections directly with each other or via the X2 gateway. Various procedures are disclosed to determine how X2 connections should be established based on compatibility of the respective base stations with the X2 gateway.

1 Claim, 13 Drawing Sheets

(51) Int. Cl.
*H04W 76/11* (2018.01)
*H04W 36/04* (2009.01)
*H04W 88/16* (2009.01)
*H04W 92/20* (2009.01)
*H04W 92/10* (2009.01)

(52) U.S. Cl.
CPC ............ *H04W 88/16* (2013.01); *H04W 92/10* (2013.01); *H04W 92/20* (2013.01)

(56) References Cited

U.S. PATENT DOCUMENTS

| | | | |
|---|---|---|---|
| 2011/0274030 A1 | 11/2011 | Wang et al. | |
| 2011/0274086 A1 | 11/2011 | Xu | |
| 2011/0310791 A1* | 12/2011 | Prakash | H04W 24/02 370/315 |
| 2012/0015683 A1 | 1/2012 | Gao | |
| 2012/0100860 A1* | 4/2012 | Lei | H04W 36/20 455/438 |
| 2012/0120915 A1 | 5/2012 | Wang et al. | |
| 2012/0257571 A1* | 10/2012 | Liao | H04W 4/70 370/328 |
| 2012/0307795 A1* | 12/2012 | Takahashi | H04W 36/0055 370/331 |
| 2013/0051316 A1 | 2/2013 | Bhatt et al. | |
| 2013/0281097 A1 | 10/2013 | Jung | |
| 2013/0322390 A1 | 12/2013 | Xu et al. | |
| 2014/0301277 A1* | 10/2014 | Ueda | H04W 24/02 370/328 |
| 2014/0335909 A1* | 11/2014 | Czerepinski | H04W 52/40 455/522 |

FOREIGN PATENT DOCUMENTS

| | | |
|---|---|---|
| WO | 2012/074325 A2 | 6/2012 |
| WO | 2012/093893 A2 | 7/2012 |
| WO | 2012/148217 A2 | 11/2012 |

OTHER PUBLICATIONS

3rd Generation Partnership Project; Technical Specification Group Radio Access Network; Evolved Universal Terrestrial Radio Access Network (E-UTRAN); S1 Application Protocol (S1AP) (Release 11), 3GPP TS 36.413 V11.3.0, Mar. 2013, Cited in the Specification.
3rd Generation Partnership Project; Technical Specification Group Radio Access Network; Evolved Universal Terrestrial Radio Access Network (E-UTRAN); X2 Application Protocol (X2AP) Release 11, 3GPP TS 36.423 V11.4.0, Mar. 2013, Cited in the Specification.
New Postcom, "X2 connection and routing for X2-GW deployment", 3GPP TSG RAN WG3 Meeting #78, Nov. 2012, R3-122673, New Orleans, USA, Cited in ISR.
Nokia Siemens Networks, "How to handle the HeNB switch off", 3GPP TSG-RAN WG3 Meeting #80, May 2013, R3-130853, Fukuoka, Japan, Cited in ISR.
International Search Report for PCT Application No. PCT/JP2014/063630, dated Dec. 11, 2014.
Japanese Office Action for JP Application No. 2015-556276 dated Dec. 7, 2016.
3rd Generation Partnership Project; Technical Specification Group Radio Access Network; Universal Mobile Telecommunications System (UMTS) and LTE; Mobility enhancements for Home Node B (HNB) and Home enhanced Node B (HeNB) (Release 11), 3GPP TR 37.803, V11.1.0, Dec. 2012, pp. 99-101, Cited in JPOA.
Nokia Siemens Networks, "HeNB initiated discovery", 3GPP TSG RAN WG3 #79 meeting, Jan. 28 to Feb. 1, 2013, R3-130075, Malta, Cited in JPOA.
Japanese Office Action for JP Application No. 2015-556276 dated Aug. 16, 2017.
ZTE, "X2 Setup between eNB and HeNB", 3GPP TSG-RAN3 Meeting #80, May 2013, R3-131011, Fukuoka, Japan, Cited in JPOA.

* cited by examiner

COMMUNICATIONS SYSTEM

CROSS-REFERENCE TO RELATED APPLICATIONS

The present application is a continuation application of U.S. patent application Ser. No. 14/893,173 filed on Nov. 23, 2015, U.S. Pat. No. 10,004,103 issued on Jun. 19, 2018, which is a National Stage Entry of International Application PCT/JP2014/063630, filed on May 16, 2014, which claims the benefit of priority from United kingdom Patent Application 1309970.0 filed on Jun. 4, 2013, the disclosures of all of which are incorporated in their entirety by reference herein.

TECHNICAL FILED

The present invention relates to a communications system and to components thereof for providing communication services to mobile or fixed communication devices. The invention has particular, but not exclusive, relevance to the discovery of transport network layer (TNL) addresses used by base stations in Long Term Evolution (LTE) Advanced systems as currently defined in associated 3rd Generation Partnership Project (3GPP) standards documentation; and to the use of the TNL addresses for setting up X2 interfaces between neighbouring base stations.

BACKGROUND ART

In a cellular communications network, user equipment (UE) (such as mobile telephones, mobile devices, mobile terminals, etc.) can communicate with other user equipment and/or remote servers via base stations. LTE systems include an Evolved Universal Terrestrial Radio Access Network (E-UTRAN) and an Evolved Packet Core (EPC) network (or simply 'core network'). The E-UTRAN includes a number of base stations ('eNBs') for providing both user-plane (e.g. Packet Data Convergence Protocol (PDCP), Radio Link Control (RLC), Medium Access Control (MAC) and PHYsical (PHY) layers) and control-plane (e.g. Radio Resource Control (RRC)) protocol terminations towards the UE.

In order to provide seamless connectivity for the mobile devices, the base stations are configured with a list of their neighbour base stations so that the mobile devices can be handed over to one of the cells operated by other base stations when necessary (e.g. due to mobility of the mobile devices and/or changes in signal conditions and/or load balancing, etc). Therefore, each base station is required to store information relating to its neighbours including, inter alia, identifiers of the cells operated by each (known) neighbour base station, a unique identifier (e.g. eNB Id) associated with each neighbour base station, and a respective transport network layer (TNL) address associated with each neighbour base station. The TNL address facilitates communication between base stations via a so-called X2 interface, which is provided between each neighbour base station pair. The X2 interface uses the Stream Control Transmission Protocol (SCTP) to transmit data between the base stations.

Each base station can obtain the TNL address associated with another base station by following a so-called TNL Address Discovery procedure specified in section 22.3.6 of 3GPP TS 36.300 V11.5.0, the contents of which are incorporated herein by reference. In summary, whenever a particular base station discovers a 'candidate' neighbour base station, it can request the so-called Mobility Management Entity (MME) in the core network to transfer configuration information between the two base stations via an S1 interface (which is provided between each base station and the core network). This procedure needs to be followed whenever there is a change in the configuration of one of the base stations and/or whenever a base station or a cell is added to (or removed from) the network to prevent handover problems for the mobile devices (e.g. incorrect selection of a handover target cell, which might result in loss of connection) in the vicinity of such cells. Since conventional (macro) base stations operate in an always-on mode and their configuration does not change often, this procedure does not cause unnecessary load on the core network elements and the S1 interface between the eNB s and the MME.

The 3GPP standards body has adopted an official architecture and defined standards for home base stations ('HNB'). Where a home base station is operating in accordance with the LTE standards, the home base station is sometimes referred to as a HeNB. A similar architecture is also applied in the WiMAX network. In this case, the home base station is commonly referred to as a femto cell. For simplicity, the present application will use the term HeNB to refer to any such home base station and will use the term eNB generically to refer to other base stations (such as the base station for the macro cell in which a HeNB operates). The HeNB can provide radio coverage (for example, 3G/4G/WiMAX) via one or more cells within a home, small and medium enterprise environment, and/or in public places (such as shopping malls and the like). The HeNB connects to the core network via a suitable public network (for example via an ADSL link to the Internet) or operator network and in the case of the 3GPP standards, via a so called small cell gateway (e.g. including the functionality of a so called HeNB-GW) which typically aggregates traffic from several HeNBs.

SUMMARY OF INVENTION

Technical Problem

Network operators are facing a number of challenges due to HeNB deployment. For example, the HeNBs are typically under the operational control of a customer rather than the network operator. Unlike eNBs, the home base stations may power on and off frequently (e.g. gracefully for energy saving reasons and/or abruptly for any other reasons) causing frequent configuration changes in the neighbouring (home) base stations (i.e. to add/remove the cell(s) operated by these home base stations and/or to update the corresponding X2 connections). In a worst case scenario, after a power ON/Off cycle, the TNL Address of a HeNB may change (because the address assignment might be the responsibility of another provider, e.g. an Internet service provider, ISP). Hence, e.g. in the morning/evening when it becomes active in a typical home environment, every HeNB triggers a TNL Address Discovery process on discovering each of its neighbours, which are most likely the same neighbours as before. Although each HeNB discovers a small number of neighbours only, on a national level it can be in the order of millions, depending on the number of households operating their own HeNB.

Another challenge resulting from the high number of HeNBs is that each base station (i.e. eNB/HeNB) needs to maintain a large number of X2 connections (i.e. one with each of its neighbour eNBs/HeNBs). In order to reduce the number of X2 connections to be maintained in an eNB, a so-called X2-Gateway (X2-GW) entity (which may form part of or may be separate from the small cell gateway) can be provided between the eNBs and a predetermined group of HeNBs. In particular, the X2-GW makes it possible for an eNB to establish a single X2 connection with the X2-GW for each of a plurality of HeNBs that are also connected to that X2-GW.

To support the use of such an X2-GW, a modified TNL address discovery procedure has been proposed that is based on the TNL discovery procedure described above (referred to hereafter as the "legacy TNL address discovery procedure"). In the modified TNL address discovery procedure, the HeNB returns the TNL address of the X2-GW instead of its own TNL address. However, the inventors have identified a number of problems with the current proposals:

1) Whenever an eNB discovers an HeNB, if the HeNB returns the TNL address of the X2-GW to the eNB and the eNB does not support X2-GW operability, then the process will fail as the eNB is not able to establish a connection via the X2-GW.
2) Whenever an HeNB discovers an eNB and the eNB does not support X2-GW operability, if the HeNB tries to establish a connection to the eNB via the X2-GW, then the process will fail.
3) Whenever a source HeNB discovers a target HeNB, if the source HeNB tries to establish the X2 connection via the X2-GW and the target HeNB does not support the X2-GW, then the process will fail.

Solution of Problem

The inventors have made a number of improvements that try to alleviate one or more of these problems.

According to one aspect, the present invention provides a source base station for use in a communication system having a plurality of other base stations, the source base station comprising: a neighbour discovery module for discovering a neighbouring target base station; and a network address discovery module for sending, towards the target base station, a configuration request message for requesting network address information relating to the target base station; wherein the network address discovery module is arranged to include information in said configuration request message indicating whether or not the source base station supports use of an X2 gateway device through which an X2 connection can be established between the source base station and the target base station.

The network address discovery module may be arranged to receive a configuration response message sent from the target base station, which configuration response message includes network address information relating to the target base station and information indicating whether or not the target base station supports use of an X2 gateway device through which the X2 connection can be established between the source base station and the target base station. In this case, the configuration response message sent by the target base station may include a network address of an X2 gateway device supported by the target base station. A network connection module may also be provided that establishes a network communication link with the X2 gateway device supported by the target base station using the network address included in the configuration response message. In one embodiment, the source base station registers with the X2 gateway device supported by the target base station using the network address included in the configuration response message. In an alternative embodiment, the configuration response message sent by the target base station includes a network address of the target base station.

The source base station may include, in said configuration request message, a network address for an X2 gateway device with which the source base station has a network communication link.

The source base station may further comprise an X2 setup module arranged to send the target base station an X2 setup request message via said X2 gateway device over the established network communication link. The X2 setup module may include the network address of the target base station in the X2 setup request message so that the X2 gateway device can establish a network connection with the target base station. The X2 setup request message may also include an identifier that identifies the target base station to which the X2 gateway device should send the X2 setup request message. Preferably each subsequent X2AP message includes an identifier that identifies the source base station.

In one embodiment, the X2 setup module receives, from the X2 gateway device, an X2 setup response message sent by the target base station, to complete the establishment of an X2 connection between the source base station and the target base station through the X2 gateway device.

The network address information relating to the target base station included in the configuration response message depends upon whether or not both the source base station and the target base station support the use of an X2 gateway device through which the X2 connection between the source base station and the target base station can be established.

The source base station is arranged to determine whether or not to include an identifier for the target base station in subsequent X2 communication messages transmitted over the X2 connection established between the source base station and the target base station depending upon information included in or absent from the configuration response message.

For example, the source base station may be arranged to include an identifier for the target base station in subsequent X2 communication messages transmitted over the X2 connection established between the source base station and the target base station if information included in the configuration response message indicates that the target base station supports use of the X2 gateway device; and is arranged not to include the identifier for the target base station in subsequent X2 communication messages transmitted over the X2 connection established between the source base station and the target base station if the configuration response message does not include information indicating that the target base station supports the use of the X2 gateway device.

The source base station may also be arranged to include an identifier for the source base station in subsequent X2 communication messages transmitted over the X2 connection if it determines to include an identifier for the target base station.

The identifier for the target base station may comprise a radio network layer address or ID.

The invention also provides a target base station for use in a communication system having a plurality of other base stations, the target base station comprising: a communications control module arranged to receive a configuration request message sent by a source base station and arranged to send, towards the source base station, a configuration response message having address information relating to the target base station; wherein the communications control module is arranged to include information in said configuration response message indicating whether or not the target base station supports use of an X2 gateway device through which an X2 connection can be established between the source base station and the target base station.

The configuration response message may include a network address of an X2 gateway device supported by the target base station. Alternatively, the configuration response message may include a network address of the target base station.

The configuration request message may include a network address for an X2 gateway device with which the source base station has a network communication link and the target base station may register with the X2 gateway device using the address included within the configuration request message.

Typically, the target base station will include an X2 setup module arranged to receive, via said X2 gateway device, an X2 setup request message from the source base station. In this case, the X2 setup module may send, via the X2 gateway device, an X2 setup response message to the source base station, to complete the establishment of an X2 connection between the source base station and the target base station through the X2 gateway device.

The X2 setup module may include an identifier of the source base station in the X2 setup response message so that the X2 gateway device can send the X2 setup response message to the source base station. Typically, the X2 setup response message includes an identifier that identifies the target base station.

In one embodiment, the network address information relating to the target base station included in the configuration response message depends upon whether or not both the source base station and the target base station support the use of an X2 gateway device through which the X2 connection between the source base station and the target base station can be established. The target base station may determine whether or not to include an identifier for the source base station in subsequent X2 communication messages transmitted over the X2 connection established between the source base station and the target base station depending upon information included in or absent from the configuration request message. For example, the target base station may include an identifier for the source base station in subsequent X2 communication messages transmitted over the X2 connection established between the source base station and the target base station if the information included in the configuration request message indicates that the source base station supports use of the X2 gateway device; and does not to include the identifier for the source base station in subsequent X2 communication messages transmitted over the X2 connection established between the source base station and the target base station if the configuration request message does not include information indicating that the target base station supports the use of the X2 gateway device. The target base station may also be arranged to include an identifier for the target base station in subsequent X2 communication messages transmitted over the X2 connection if it determines to include an identifier for the source base station. The identifier for the source base station may be a radio network layer address or ID.

According to another aspect, the present invention provides a source base station for use in a communication system having a plurality of other base stations, the source base station comprising: a neighbour discovery module for discovering a neighbouring target base station; and an X2 setup module arranged to send, without performing a network address discovery procedure for the target base station, an X2 setup request to an X2 gateway device associated with the source base station; wherein the X2 setup request is arranged to include an identifier for the target base station for use by the X2 gateway device to determine if the target base station supports X2 connection setup through the X2 gateway device.

In the event that an X2 setup failure message is received from the X2 gateway device indicating that the target base station does not support use of the X2 gateway device, the source base station may be arranged to trigger a network address discovery procedure to determine a network address for the target base station in order to establish a direct X2 connection with the target base station.

According to another aspect, the present invention provides an X2 gateway device for use in a communication system having a plurality of base stations, the X2 gateway device comprising: a base station registration module for registering one or more base stations with the X2 gateway device; a memory having base station data for registered base stations, the base station data including network address data and identifier data for each registered base station; and an X2 setup module for receiving an X2 setup request message from a source base station that is registered with the X2 gateway device, the X2 setup request message including an identifier for a target base station; wherein the X2 setup module is arranged to use the identifier for the target base station in the received X2 setup request message to determine if the base station data in said memory includes a network address for the target base station.

If the X2 setup module determines that the base station data in said memory does not include a network address for the target base station, the X2 setup module may send the source base station an X2 setup failure message with a cause of failure indicating that the target base station does not support X2 connection through the X2 gateway device.

If the X2 setup module determines that the base station data in said memory does include a network address for the target base station, the X2 setup module may send the X2 setup message from the source base station to the target base station using the network address contained in said base station data.

According to another aspect, the present invention provides a source base station for use in a communication system having a plurality of other base stations, the source base station comprising: a neighbour discovery module arranged to discover a neighbouring target base station; and an X2 setup module arranged: i) to send an X2 neighbour notify message to an X2 gateway device associated with the source base station, the X2 neighbour notify message including an identifier for the target base station for use by the X2 gateway device to determine if the target base station supports X2 connection setup through the X2 gateway device; and ii) to receive a notification from the X2 gateway device indicating whether or not the target base supports X2 connection through the X2 gateway device.

The X2 setup module may be arranged to send, in the event that the notification received from the X2 gateway device indicates that the target base station supports X2 connection through the X2 gateway device, an X2 setup request message to the X2 gateway device, the X2 setup request message including an identifier for the target base station. In the event that the notification received from the X2 gateway device indicates that the target base station does not support use of the X2 gateway device, the source base station may trigger a network address discovery procedure to determine a network address for the target base station in order to establish a direct X2 connection with the target base station.

According to another aspect, the present invention provides an X2 gateway device for use in a communication system having a plurality of base stations, the X2 gateway device comprising: a base station registration module for registering one or more base stations with the X2 gateway device; a memory having base station data for registered base stations, the base station data including network address data and identifier data for each registered base station; and an X2 setup module arranged: i) to receive an X2 neighbour notify message from a source base station, the X2 neighbour notify message including an identifier for a target base station; ii) to use the identifier for the target base station in the received X2 neighbour notify message to determine if the base station data in said memory includes a network address for the target base station; and iii) to send the source base station a notification indicating whether or not the target base supports X2 connection through the X2 gateway device depending on whether or not the base station data in said memory includes a network address for the target base station.

The X2 setup module may be further arranged: iv) to receive an X2 setup request message from the source base station, the X2 setup request message including an identifier for a target base station; v) to retrieve a network address for the target base station from said base station data; and vi) to send the X2 setup request to the target base station using the retrieved network address for the target base station. If the X2 setup module determines that the base station data in said memory does not include a network address for the target base station, the X2 setup module may send the source base station a notification indicating that the target base station does not support X2 connection through the X2 gateway device.

According to another aspect, the present invention provides a source base station for use in a communication system having a plurality of other base stations, the source base station comprising: means for discovering a neighbouring target base station; and means for sending, towards the target base station, a configuration request message for requesting network address information relating to the target base station; wherein the means for sending is arranged to include information in said configuration request message indicating whether or not the source base station supports use of an X2 gateway device through which an X2 connection can be established between the source base station and the target base station.

According to another aspect, the present invention provides a target base station for use in a communication system having a plurality of other base stations, the target base station comprising: means for receiving a configuration request message sent by a source base station and for sending, towards the source base station, a configuration response message having address information relating to the target base station; wherein the target base station is arranged to include information in said configuration response message indicating whether or not the target base station supports use of an X2 gateway device through which an X2 connection can be established between the source base station and the target base station.

According to another aspect, the present invention provides a source base station for use in a communication system having a plurality of other base stations, the source base station comprising: means for discovering a neighbouring target base station; and means for sending, without performing a network address discovery procedure for the target base station, an X2 setup request to an X2 gateway device associated with the source base station; wherein the X2 setup request is arranged to include an identifier for the target base station for use by the X2 gateway device to determine if the target base station supports X2 connection setup through the X2 gateway device.

According to another aspect, the present invention provides an X2 gateway device for use in a communication system having a plurality of base stations, the X2 gateway device comprising: means for registering one or more base stations with the X2 gateway device; a memory having base station data for registered base stations, the base station data including network address data and identifier data for each registered base station; and means for receiving an X2 setup request message from a source base station that is registered with the X2 gateway device, the X2 setup request message including an identifier for a target base station; and means for using the identifier for the target base station in the received X2 setup request message to determine if the base station data in said memory includes a network address for the target base station.

According to another aspect, the present invention provides a source base station for use in a communication system having a plurality of other base stations, the source base station comprising: means for discovering a neighbouring target base station; and means for sending an X2 neighbour notify message to an X2 gateway device associated with the source base station, the X2 neighbour notify message including an identifier for the target base station for use by the X2 gateway device to determine if the target base station supports X2 connection setup through the X2 gateway device; and means for receiving a notification from the X2 gateway device indicating whether or not the target base supports X2 connection through the X2 gateway device.

According to another aspect, the present invention provides an X2 gateway device for use in a communication system having a plurality of base stations, the X2 gateway device comprising: means for registering one or more base stations with the X2 gateway device; a memory having base station data for registered base stations, the base station data including network address data and identifier data for each registered base station; and means for receiving an X2 neighbour notify message from a source base station, the X2 neighbour notify message including an identifier for a target base station; means for using the identifier for the target base station in the received X2 neighbour notify message to determine if the base station data in said memory includes a network address for the target base station; and means for sending the source base station a notification indicating whether or not the target base supports X2 connection through the X2 gateway device depending on whether or not the base station data in said memory includes a network address for the target base station.

According to another aspect, the present invention provides a method performed by a source base station of a communication system having a plurality of other base stations, the method comprising: discovering a neighbouring target base station; sending, towards the target base station, a configuration request message for requesting network address information relating to the target base station; and including information in said configuration request message indicating whether or not the source base station supports use of an X2 gateway device through which an X2 connection can be established between the source base station and the target base station.

According to another aspect, the present invention provides a method performed by a target base station of a communication system having a plurality of other base stations, the method comprising: receiving a configuration request message sent by a source base station; sending, towards the source base station, a configuration response message having address information relating to the target base station; and including information in said configuration response message indicating whether or not the target base station supports use of an X2 gateway device through which an X2 connection can be established between the source base station and the target base station.

According to another aspect, the present invention provides a method performed by a source base station of a communication system having a plurality of other base stations, the method comprising: discovering a neighbouring target base station; sending, without performing a network address discovery procedure for the target base station, an X2 setup request to an X2 gateway device associated with the source base station; and including in the X2 setup request, an identifier for the target base station for use by the X2 gateway device to determine if the target base station supports X2 connection setup through the X2 gateway device.

According to another aspect, the present invention provides a method performed by an X2 gateway device of a communication system having a plurality of base stations, the method comprising: registering one or more base stations with the X2 gateway device; storing base station data for registered base stations, the base station data including network address data and identifier data for each registered base station; and receiving an X2 setup request message from a source base station that is registered with the X2 gateway device, the X2 setup request message including an identifier for a target base station; and using the identifier for the target base station in the received X2 setup request message to determine if the base station data in said memory includes a network address for the target base station.

According to another aspect, the present invention provides a method performed by a source base station of a communication system having a plurality of other base stations, the method comprising: discovering a neighbouring target base station; and sending an X2 neighbour notify message to an X2 gateway device associated with the source base station, the X2 neighbour notify message including an identifier for the target base station for use by the X2 gateway device to determine if the target base station supports X2 connection setup through the X2 gateway device; and receiving a notification from the X2 gateway device indicating whether or not the target base supports X2 connection through the X2 gateway device.

According to another aspect, the present invention provides a method performed by an X2 gateway device of a communication system having a plurality of base stations, the method comprising: registering one or more base stations with the X2 gateway device; storing base station data for registered base stations, the base station data including network address data and identifier data for each registered base station; receiving an X2 neighbour notify message from a source base station, the X2 neighbour notify message including an identifier for a target base station; using the identifier for the target base station in the received X2 neighbour notify message to determine if the stored base station data includes a network address for the target base station; and sending the source base station a notification indicating whether or not the target base station supports X2 connection through the X2 gateway device depending on whether or not the stored base station data includes a network address for the target base station.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

BRIEF DESCRIPTION OF DRAWINGS

Embodiments of the invention will now be described, by way of example, with reference to the accompanying drawings in which.

DESCRIPTION OF EMBODIMENTS

Overview

Figure 1:
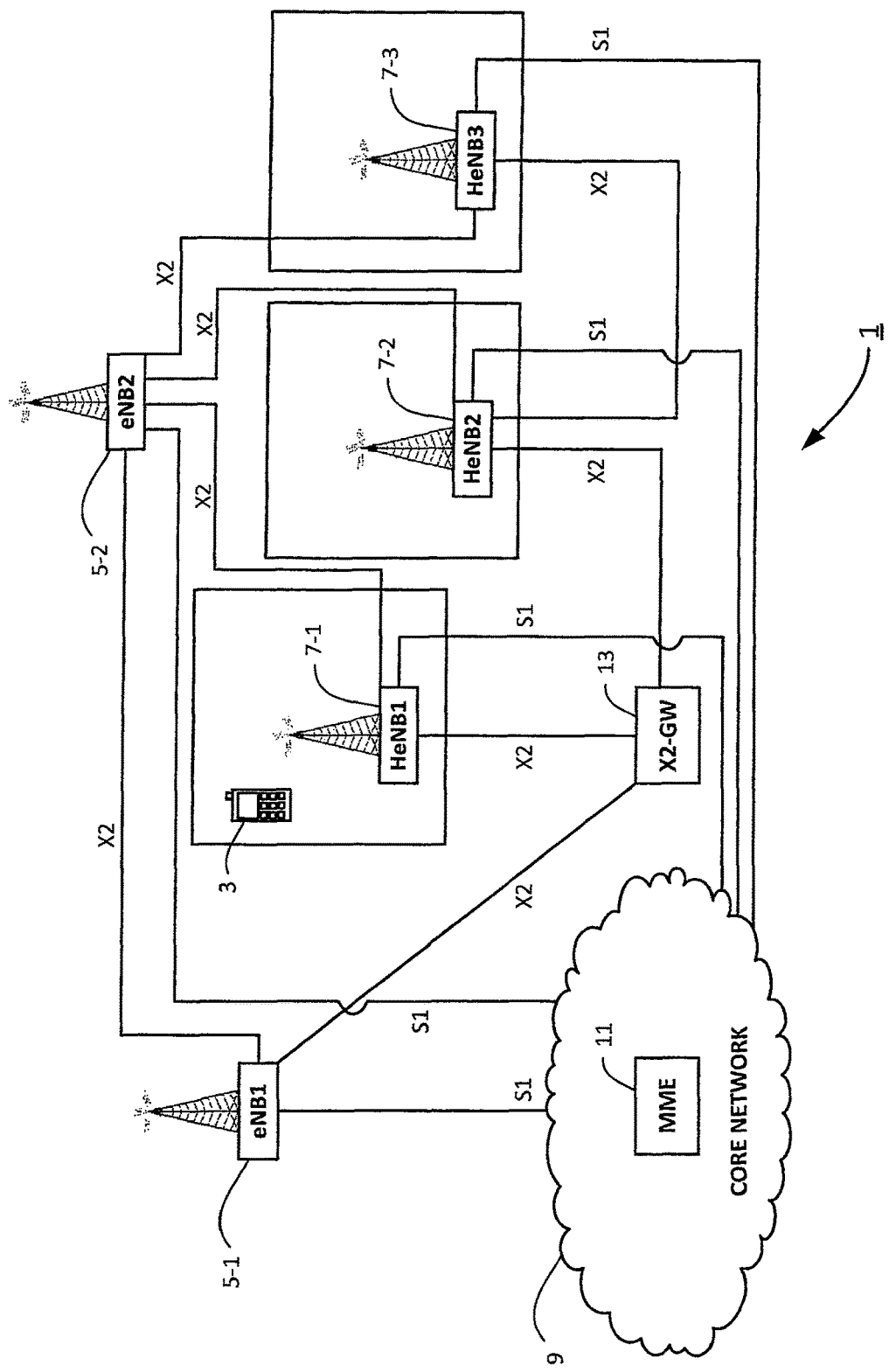
FIG. 1 schematically illustrates a mobile telecommunication system of a type to which the invention is applicable.

FIG. 1 schematically illustrates a mobile (cellular) telecommunication system 1 including a mobile telephone 3 (or other compatible user equipment) served via a macro cell of one of the macro base stations 5-1 or 5-2 (eNB) and/or home cells of a plurality of home base stations 7-1, 7-2 or 7-3 (HeNBs). The telecommunication system 1 also comprises a core network 9.

Each macro base station 5 and each home base station 7 is connected to the core network 9 via an S1 interface. The core network 9 comprises, amongst other things, a mobility management entity (MME) 11. The base stations 5 and 7 are also connected to each other via a so-called X2 interface, which is usually provided directly between each pair of (home) base stations. However, in this embodiment, an X2 gateway (X2-GW) 13 entity is provided via which X2 connections can be made for compatible macro base stations 5-1 and home base stations 7-1 and 7-2. The X2-GW 13 is also connected to the core network 9, e.g. via an interface towards the MME 11. Legacy base stations (such as macro base station 5-2 or home base station 7-3) cannot connect via the X2-GW 13, so their X2 connections are made directly with the corresponding other base station 5 or 7. This is illustrated in FIG. 1, for example, by the direct X2 connection between HeNB 7-2 and HeNB 7-3.

As will be understood by those skilled in the art, each eNB 5/HeNB 7 operates one or more cells in which communications can be made between the eNB 5/HeNB 7 and the mobile telephone 3. A user of the mobile telephone 3 can communicate with other users and/or remote servers via the eNB 5/HeNB 7 and the core network 9. As those skilled in the art will appreciate, whilst one mobile telephone 3, two macro base stations 5-1 and 5-2, and three home base stations 7-1, 7-2, and 7-3 are shown in FIG. 1 for illustration purposes, the system, when implemented, will typically include other mobile telephones and base stations.

Base Station

Figure 2:
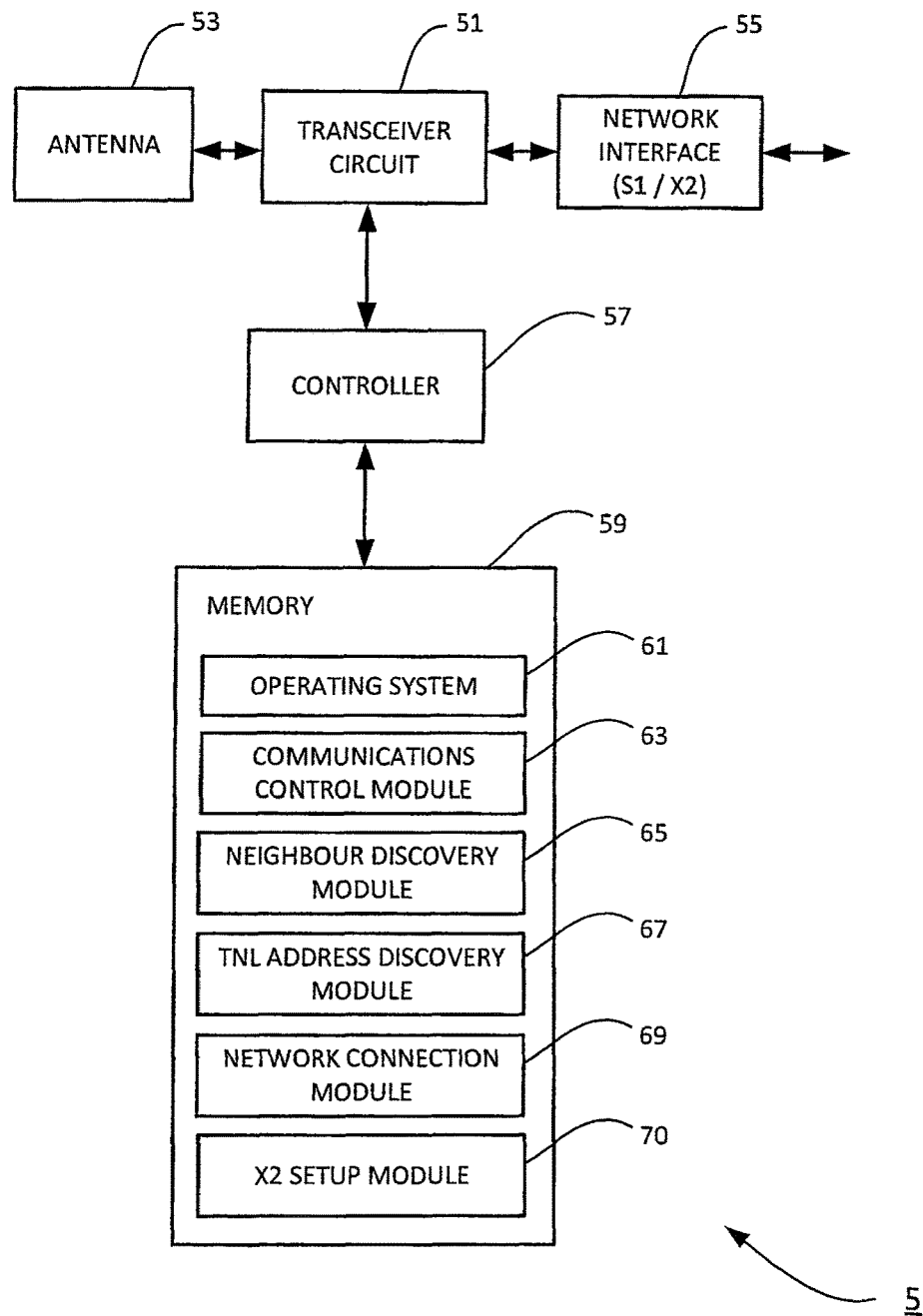
FIG. 2 is a block diagram illustrating the main components of a base station forming part of the system shown in FIG. 1.

FIG. 2 is a block diagram illustrating the main components of one of the macro base stations (eNB) 5 shown in FIG. 1. As shown, the eNB 5 includes transceiver circuitry 51 which is operable to transmit signals to, and to receive signals from, the mobile telephone 3 via one or more antennae 53 and which is operable to transmit signals to and to receive signals from another base station 5, the HeNB 7, the X2-GW 13, and the MME 11 via a network interface 55. The operation of the transceiver circuitry 51 is controlled by a controller 57 in accordance with software stored in memory 59. The software includes, among other things, an operating system 61, a communications control module 63, a neighbour discovery module 65, a TNL address discovery module 67, a network connection module 69 and an X2 setup module 70.

The communications control module 63 is operable to handle (e.g. generate, send and receive) control signals for controlling the connections between the base station 5 and other entities, such as the mobile telephone 3, other base stations, the mobility management entity 11, and/or the X2-GW 13.

The neighbour discovery module 65 is operable to scan the base station's 5 neighbourhood (without transmitting any data) in order to discover neighbours in its vicinity. The neighbour discovery module 65 may also be operable to discover neighbours through other means, e.g. using its Automatic Neighbour Relation (ANR) functionality and/or a Network Monitor Mode (NMM) module.

The TNL address discovery module 67 is arranged to use a TNL address discovery procedure to determine the TNL address of a new neighbour identified by the neighbour discovery module 65.

The network connection module 69 is arranged to establish network connections (such as SCTP connections) with the discovered neighbour or X2-GW 13 (depending on the capabilities of each base station 5).

The X2 setup module 70 is arranged to establish an X2 connection with the discovered neighbour either directly or via the X2-GW 13 (depending on the capabilities of each base station 5).

Home Base Station

Figure 3:
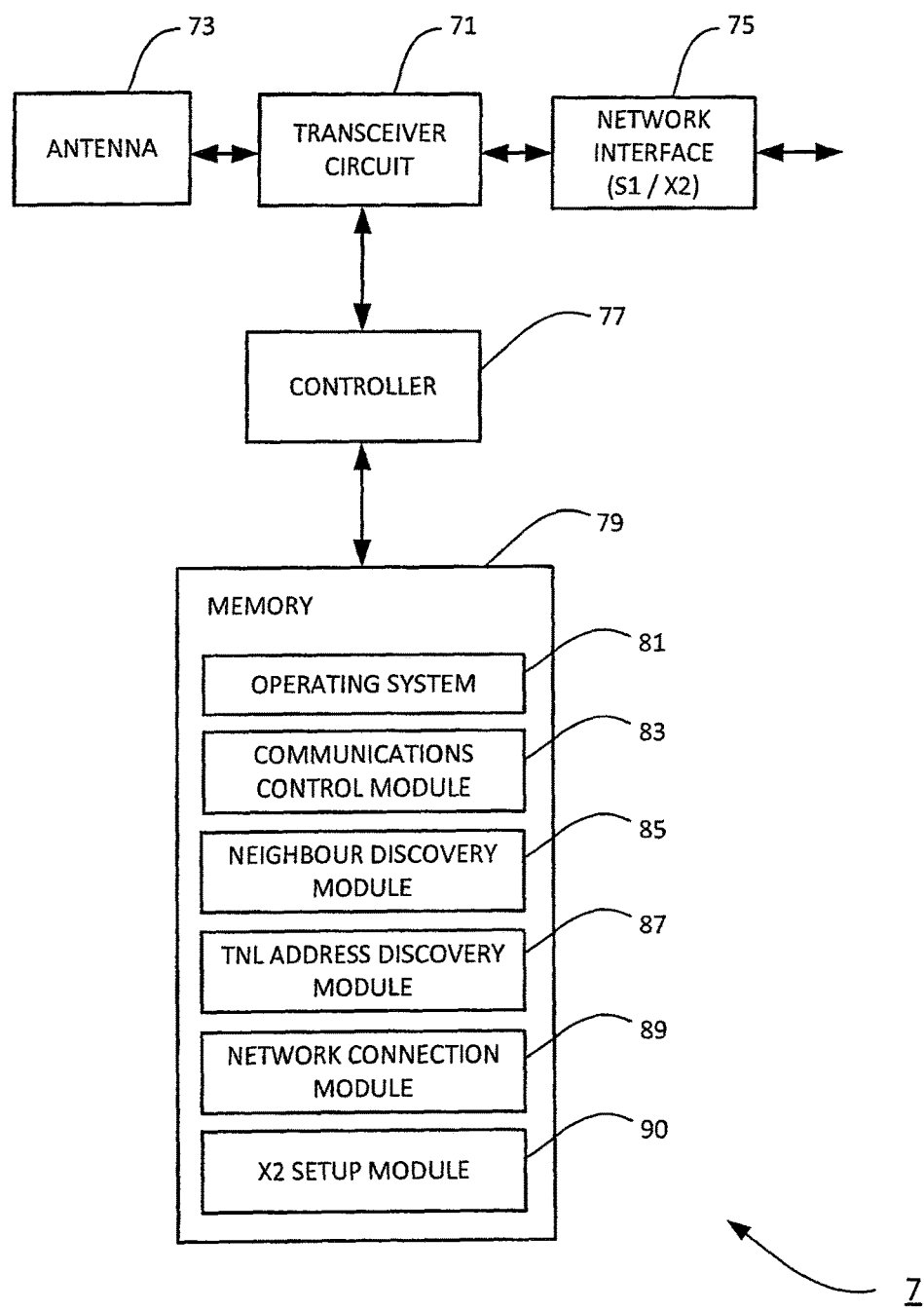
FIG. 3 is a block diagram illustrating the main components of a home base station forming part of the system shown in FIG. 1.

FIG. 3 is a block diagram illustrating the main components of one of the home base stations (HeNB) 7 shown in FIG. 1. As shown, the HeNB 7 includes transceiver circuitry 71 which is operable to transmit signals to, and to receive signals from, the mobile telephone 3 via one or more antennae 73 and which is operable to transmit signals to and to receive signals from the eNB 5, another HeNB 7, the X2-GW 13, and the MME 11 via a network interface 75. The operation of the transceiver circuitry 71 is controlled by a controller 77 in accordance with software stored in memory 79. The software includes, among other things, an operating system 81, a communications control module 83, a neighbour discovery module 85, a TNL address discovery module 87, a network connection module 89 and an X2 setup module 90.

The communications control module 83 is operable to handle (e.g. generate, send and receive) control signals for controlling the connections between the home base station 7 and other entities, such as the mobile telephone 3, other base stations, the mobility management entity 11, and/or the X2 gateway 13.

The neighbour discovery module 85 is operable to scan the home base station's 7 neighbourhood (without transmitting any data) in order to discover neighbours in its vicinity. The neighbour discovery module 85 may also be operable to discover neighbours through other means, e.g. using ANR and/or NMM.

The TNL address discovery module 87 is arranged to use a TNL address discovery procedure to determine the TNL address of a new neighbour identified by the neighbour discovery module 85.

The network connection module 89 is arranged to establish network connections (such as SCTP connections) with the discovered neighbour or X2-GW 13 (depending on the capabilities of each base station 5).

The X2 setup module 90 is arranged to establish an X2 connection with the discovered neighbour either directly or via the X2-GW 13 (depending on the capabilities of each base station 5).

X2 Gateway

Figure 4:
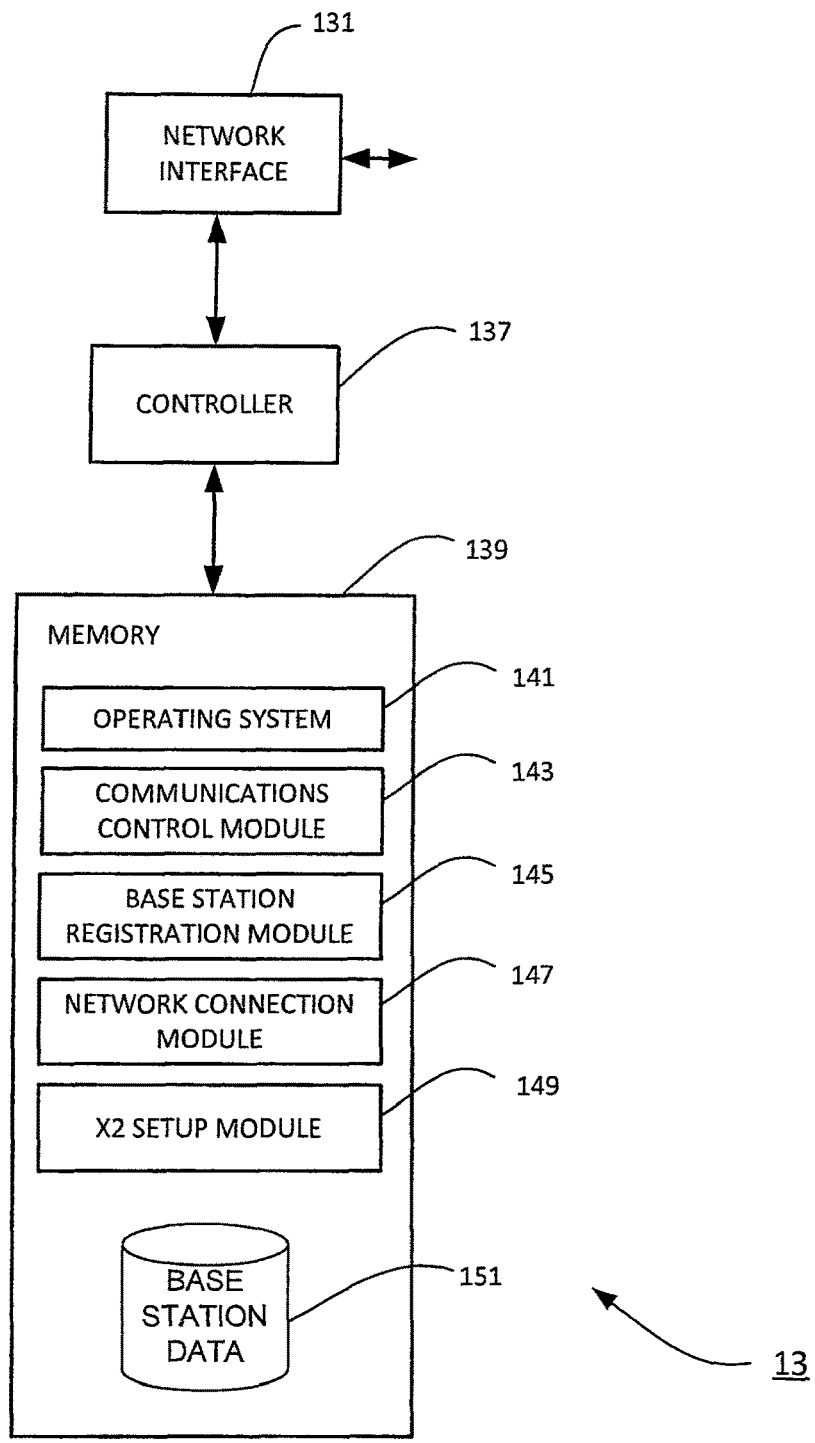
FIG. 4 is a block diagram illustrating the main components of a gateway forming part of the system shown in FIG. 1.

FIG. 4 is a block diagram illustrating the main components of the X2-GW 13 shown in FIG. 1. As shown, the X2-GW 13 includes a network interface 131 which is operable to transmit signals to, and to receive signals from, the eNBs 5 and the HeNBs 7. The operation of the network interface 131 is controlled by a controller 137 in accordance with software stored in memory 139. The software includes, among other things, an operating system 141, a communication control module 143, a base station registration module 145, a network connection module 147 and an X2 setup module 149. The memory also holds mapping data 151 that maintains data relating to base stations that are registered with the X2-GW 13.

The communications control module 143 is operable to handle (e.g. generate, send and receive) control signals for controlling the connections between the X2-GW 13 and the base stations.

The base station registration module 145 is operable to register base stations (including eNBs 5 and HeNBs 7) that are currently powered on and have an SCTP association with the X2-GW 13 and to maintain a mapping table indicating correspondence between RNL identities and TNL addresses of each base station registered with the X2-GW. This mapping table is stored in the base station data 151.

The network connection module 147 is operable to establish network connections with other entities using, for example, the SCTP protocol. In particular, the network connection module 147 is operable to create a network connection (communication link) between the X2-GW 13 and a base station.

The X2 setup module 149 is arranged to establish an X2 connection with a base station on behalf of a registered base station.

In the above description, the base station 5, the home base station 7, and the X2-GW 13 are described for ease of understanding as having a number of discrete modules (such as the communications control modules, the X2 setup modules, and the network connection modules, etc.). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Operation

The operation of the communication system will now be explained for a number of different operating scenarios, in which one base station (a source base station) identifies a new neighbour base station (target base station):

Scenario #1: source=eNB and target=HeNB
Scenario #2: source=HeNB and target=eNB
Scenario #3: source=HeNB and target=HeNB If both the source base station and the target base station are compatible to operate through the X2-GW 13, then the X2 connection between them should be through the X2-GW 13; otherwise if either or both of the source base station and the target base station are not compatible with the X2-GW 13, then a direct X2 connection should be established between them.

A number of different solutions will now be described that consider the above scenarios:

Solution 1: considers Scenario #1 and Scenario #2
Solution 2: considers Scenario #3 (and possibly Scenario #1 and Scenario #2)
Solution 3: considers Scenario #3 (and possibly Scenario #1 and Scenario #2)
Solution 4: considers Scenario #1 and Scenario #2

Solution 1

In this solution, X2-GW information is exchanged between the source base station and the target base station and a new Information Element (IE) is added in the X2 setup request message to allow the X2-GW to establish the X2 connection between the source and target base stations.

Solution 1 (Scenario #1)

Figure 5:
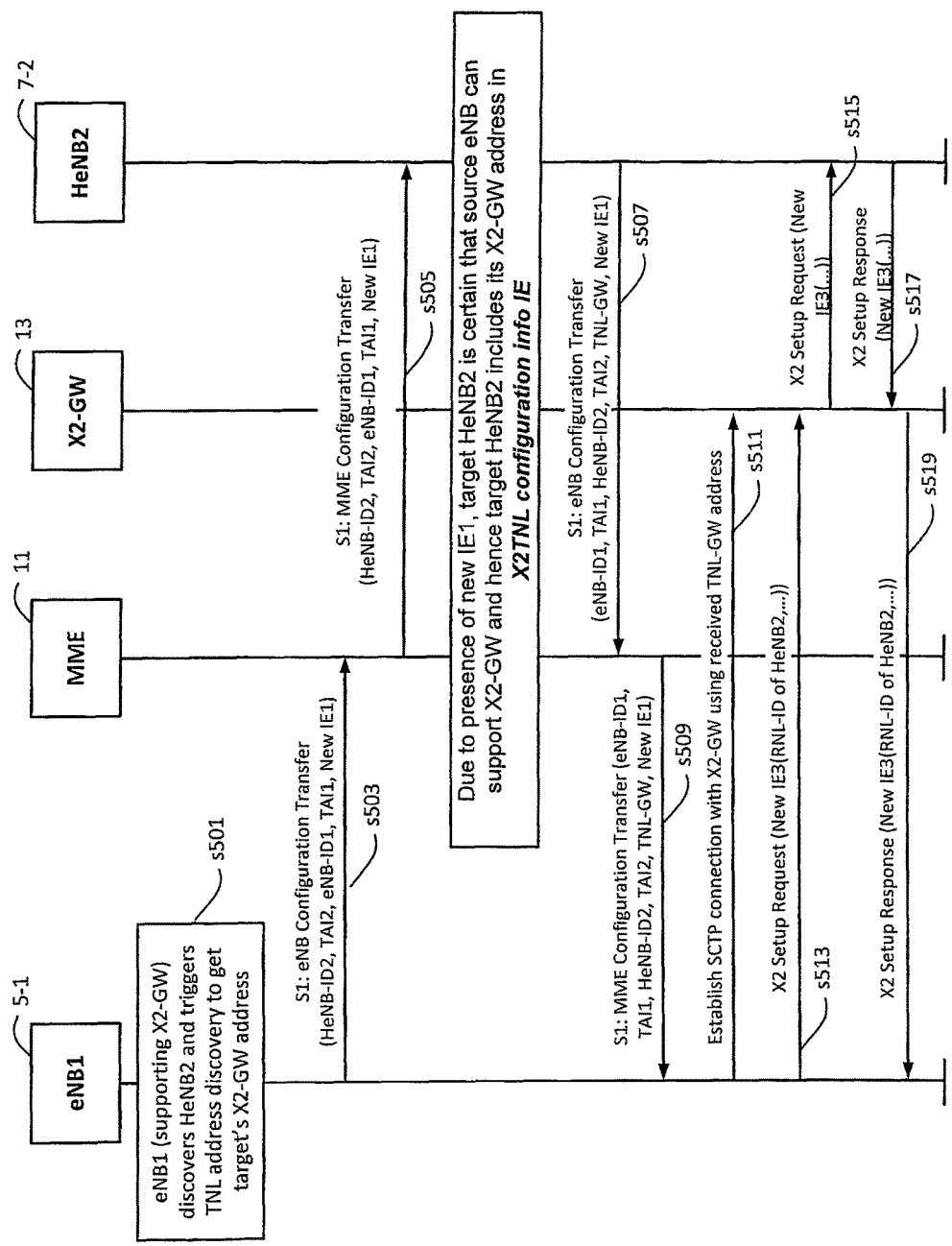
FIG. 5 is an exemplary timing diagram illustrating a method performed by components of the mobile telecommunication system of FIG. 1 whilst carrying out an embodiment of the invention.

FIG. 5 is a timing diagram illustrating the steps performed using this solution for Scenario #1 where the source is eNB1 5-1 (which supports use of the X2-GW 13) and the target is HeNB2 7-2 (which also supports use of the X2-GW 13). As shown in FIG. 5, at step s501, eNB1 5-1 discovers HeNB2 7-2. At step s503, the eNB1 5-1 initiates a TNL address discovery procedure by sending, to the MME 11, an 51 eNB Configuration Transfer message that includes the Global HeNB identifier (HeNB-ID2) of HeNB2 7-2 (as the intended recipient of the message) and its own global eNB identifier (eNB-ID1) as the message sender. The Configuration Transfer message also includes the Tracking Area Indicator (TAI2) for HeNB2, the TAI for eNB1 (TAI1) and a new Information element (IE1) that indicates that eNB1 5-1 supports use of the X2-GW 13. The new IE1 may be a single bit flag whose value indicates support or non-support for the X2-GW 13. At step s505, the MME 11 sends the Configuration Transfer message to the HeNB2 7-2.

Due to the presence of the new IE1 in the received Configuration Transfer message, and as HeNB2 7-2 also supports the use of the X2-GW 13, HeNB2 7-2 can determine whether or not the source base station (eNB1 5-1) also supports use of the X2-GW 13. In this example, the source (eNB1) does support use of the X2-GW 13, and therefore, in step s507, the target HeNB2 7-2 responds by sending a Configuration Transfer message back to MME 11, identifying the TNL address (TNL-GW) of the X2-GW 13 instead of its own TNL address. The HeNB2 7-2 also includes a new IE that indicates that the target HeNB2 7-2 supports use of the X2-GW 13 (and therefore indicating that the returned TNL address is that of the X2-GW 13 with which HeNB2 is registered). In step s509, the MME 11 sends the returned Configuration Transfer message to eNB1. In step s511, eNB1 determines from the returned Configuration Transfer message that HeNB2 also supports use of the X2-GW 13 and so uses the TNL address received in the Configuration transfer message to establish an SCTP connection with the X2-GW 13. Subsequently, in step s513, eNB1 sends an X2 Setup Request message to the X2-GW 13 over the SCTP connection it has just established with the X2-GW 13. This X2 Setup Request message includes a new IE (IE3) that includes the RNL-ID of the target base station (HeNB2). The X2 Setup Request message already includes the RNL-ID of the source base station (eNB1), so this is not required in the new IE3. The X2-GW 13 uses the RNL-ID of the target base station (HeNB2) to retrieve (from its stored mapping table) the corresponding TNL address of HeNB2 and in step s515, the X2-GW 13 forwards the X2 Setup Request message received from eNB1 to HeNB2 using the retrieved TNL address. The target base station (HeNB2) determines the identity of the source base station from the RNL-ID of the source base station that is already included in the X2 Setup Request message and in step s517 returns an X2 Setup Response message back to the X2-GW 13. This X2 Setup Response message also includes a new IE (IE4) identifying the RNL-ID of the intended recipient of the message (i.e. source eNB1) as well as its own RNL-ID address. The X2-GW 13 uses the intended recipient's RNL-ID to retrieve the corresponding TNL address from its stored mapping table and then forwards the X2 Setup Response message to base station eNB1 using the retrieved TNL address of eNB1 (which it does in step s519). Base station eNB1 uses the RNL-ID of the sender to identify the base station sending the X2 Setup Response message to complete the X2 Setup procedure between eNB1 and HeNB2. In all subsequent X2 AP messages sent between eNB1 and HeNB2, the sender includes (for example in new IE4 or new IE5) the RNL-ID of the intended recipient base station and its own RNL-ID, and the X2-GW uses the intended recipient's RNL-ID to retrieve the corresponding TNL address from its mapping table so that it can route the message to the correct base station over the correct SCTP connection.

If, on the other hand, HeNB2 7-2 does not support use of the X2-GW 13 (because for example, it is a legacy device), then the HeNB2 would simply ignore the new IE in the received Configuration Transfer message and it would respond by including its own TNL address in the returned Configuration Transfer message and there will be no new IE in the returned message, thereby indicating to eNB1 that HeNB2 does not support use of the X2-GW 13. In this case, therefore, the eNB1 would establish a direct SCTP connection with HeNB2 and then a direct X2 connection with HeNB2.

Figure 6:
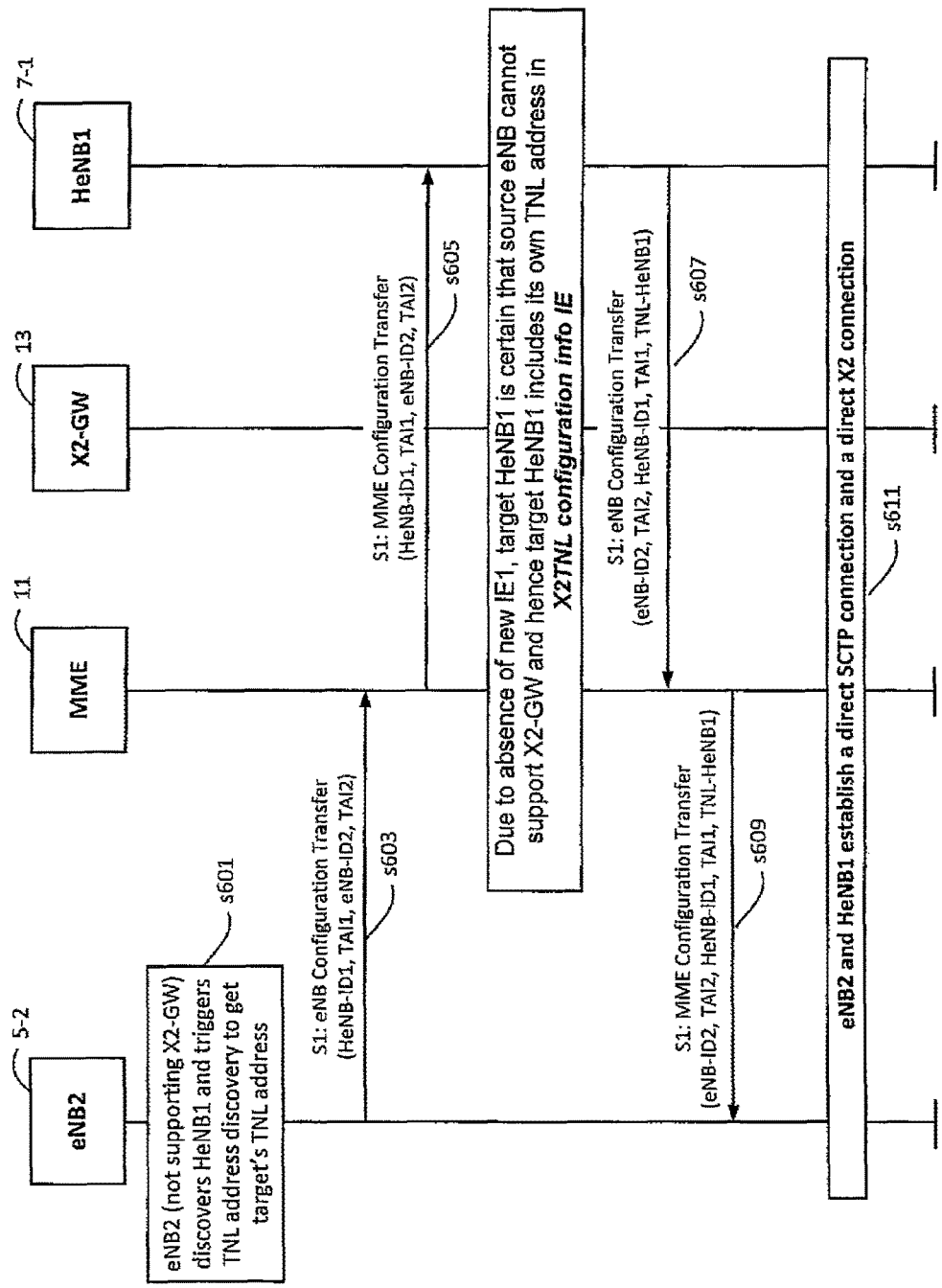
FIG. 6 is an exemplary timing diagram illustrating a method performed by components of the mobile telecommunication system of FIG. 1 whilst carrying out an embodiment of the invention.

FIG. 6 is a timing diagram illustrating the steps performed using this solution for Scenario #1 when the source is eNB2 (which does not support use of the X2-GW 13) and the target is HeNB1 7-1 (which does support use of the X2-GW 13). At step s601 eNB2 5-2 discovers HeNB1 7-1 and at step s603, eNB2 5-2 initiates a TNL address discovery procedure by sending, to the MME 11, an S1 eNB Configuration Transfer message that includes the global HeNB identifier (HeNB-ID1) of HeNB1 7-1 (as the intended recipient of the message) and its own global identifier (eNB-ID2) as the message sender. The Configuration Transfer message also includes the Tracking Area Indicator (TAI1) for HeNB1 and the TAI for eNB2 (TAI2). In this case, eNB2 does not support use of the X2-GW 13 and, therefore, the Configuration Transfer message sent in step s603 does not include the new Information element (IE1). At step s605, the MME 11 sends the Configuration Transfer message to the HeNB1 7-1.

Due to the absence of the new IE1 in the received Configuration Transfer message, HeNB1 7-1 (which does supports the use of the X2-GW 13) determines that the source base station (eNB2 5-2) does not support use of the X2-GW 13. Therefore, in step s607, HeNB1 7-1 responds by sending a Configuration Transfer message back to the MME 11, that includes its own TNL address (TNL-HeNB1). In step s609, the MME 11 sends the returned Configuration Transfer message to eNB2. In step s611, eNB2 uses the TNL address received in the Configuration Transfer message to establish a direct SCTP connection with HeNB1 and subsequent to that initiates establishment of a direct X2 connection with HeNB1.

Solution 1 (Scenario #2)

Figure 7:
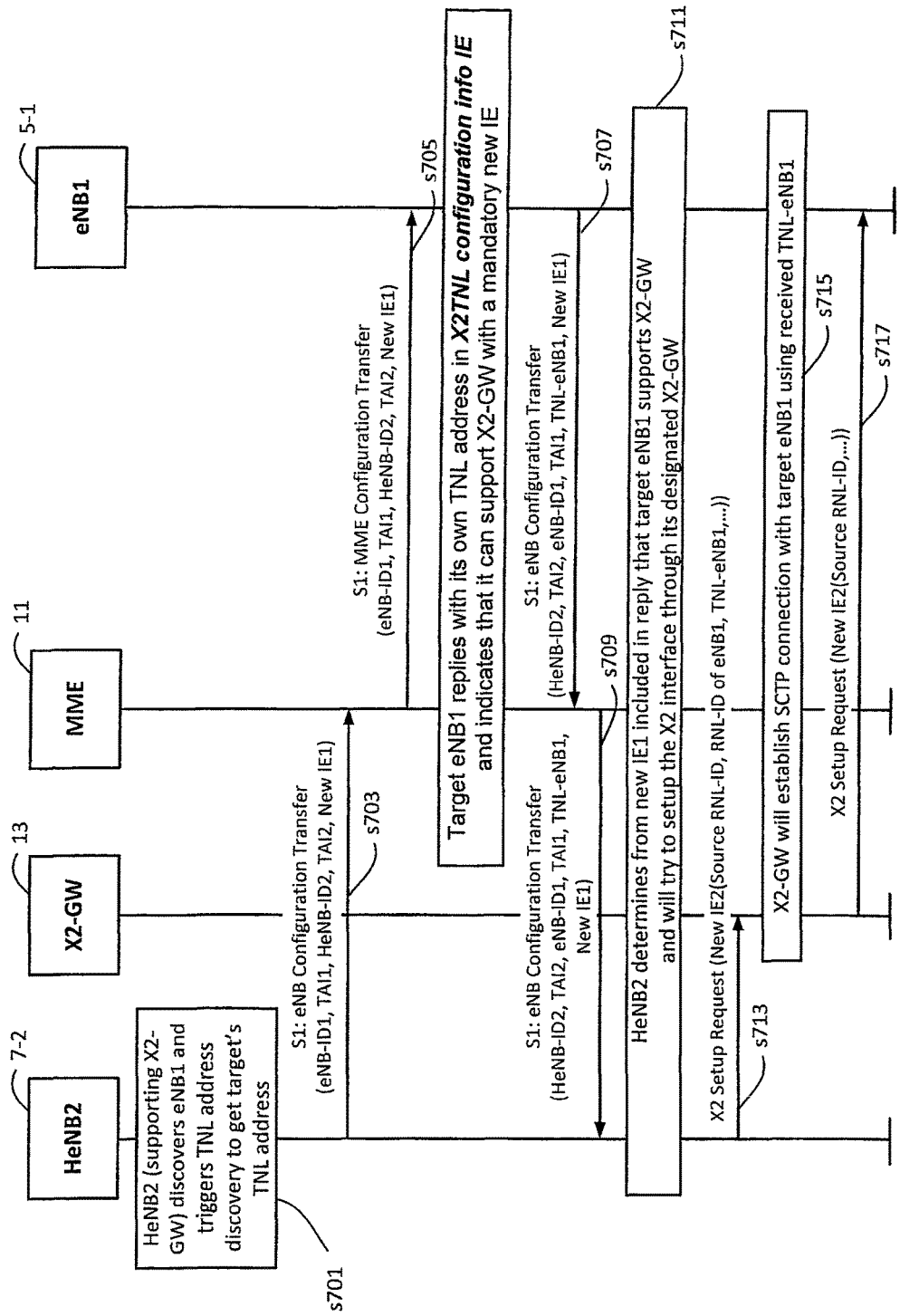
FIG. 7 is an exemplary timing diagram illustrating a method performed by components of the mobile telecommunication system of FIG. 1 whilst carrying out an embodiment of the invention.

FIG. 7 is a timing diagram illustrating the steps performed using this solution for Scenario #2 where the source is HeNB2 7-2 (which supports use of the X2-GW 13) and the target is eNB1 5-1 (which also supports use of the X2-GW 13). As shown in FIG. 7, at step s701 HeNB2 7-2 discovers eNB1 5-1. At step s703, the HeNB2 7-2 initiates a TNL address discovery procedure by sending, to the MME 11, an Si eNB Configuration Transfer message that includes the global eNB identifier (eNB-ID1) of eNB1 5-1 (as the intended recipient of the message) and its own global identifier (HeNB-ID2) as the message sender. The Configuration Transfer message also includes the Tracking Area Indicator (TAI1) for eNB1, the TAI for HeNB2 (TAI2) and a new Information element (IE1) that indicates that HeNB2 7-2 supports use of the X2-GW 13. The new IE1 may be a single bit flag whose value indicates support or non-support for the X2-GW 13. At step s705, the MME 11 sends the Configuration Transfer message to the eNB1 5-1.

In response to receiving the Configuration Transfer message, the eNB1 5-1 replies by sending, in step s707, a Configuration Transfer message back to MME 11, identifying its own TNL address (TNL-eNB1) and including a new IE (IE1) that indicates that the target eNB1 5-1 supports use of the X2-GW 13. In step s709, the MME 11 sends the returned Configuration Transfer message to the HeNB2 7-2. In step s711, the HeNB2 determines from the new IE1 in the returned Configuration Transfer message that target eNB1 supports use of the X2-GW 13.

Typically, HeNB2 will have registered with the X2-GW 13 at the time of power-up, and so there is no need for HeNB2 to register again with the X2-GW 13. Accordingly, in step s713, the source HeNB2 sends (over the SCTP connection already established between HeNB2 and X2-GW 13) an X2 Setup Request message to the X2-GW 13, which message includes a new IE (IE2) containing the RNL-ID for eNB1 (which HeNB2 obtains when it discovers eNB1) and the TNL address of eNB1 (TNL-eNB1) which HeNB2 received in step s709. In step S715, the X2-GW 13 uses the received TNL address of eNB1 to establish an SCTP connection with eNB1. In step S717, the X2-GW 13 forwards the X2 Setup Request message received from HeNB2 to eNB1. Although not shown in FIG. 7, the target base station (eNB1) determines the identity of the source base station (HeNB2) from the RNL-ID of the source base station contained within the X2 Setup Request and will respond with an X2 Setup Response message (not shown) which will be returned to HeNB2 via the X2-GW. If desired, the source base station (HeNB2) could use new IE5 instead of IE2, in which it may also include the RNL ID and/or TNL Addresses pertaining to a target base station In all subsequent X2 AP messages sent between eNB1 and HeNB2 via the X2-GW 13, the sender includes (for example in new IE4 or new IE5) the RNL-ID of the intended recipient and its own RNL-ID so that the X2-GW 13 can use the intended recipient's RNL-ID to route the message to the correct base station over the correct SCTP connection and so that the recipient knows the identity of the sending base station.

Figure 8:
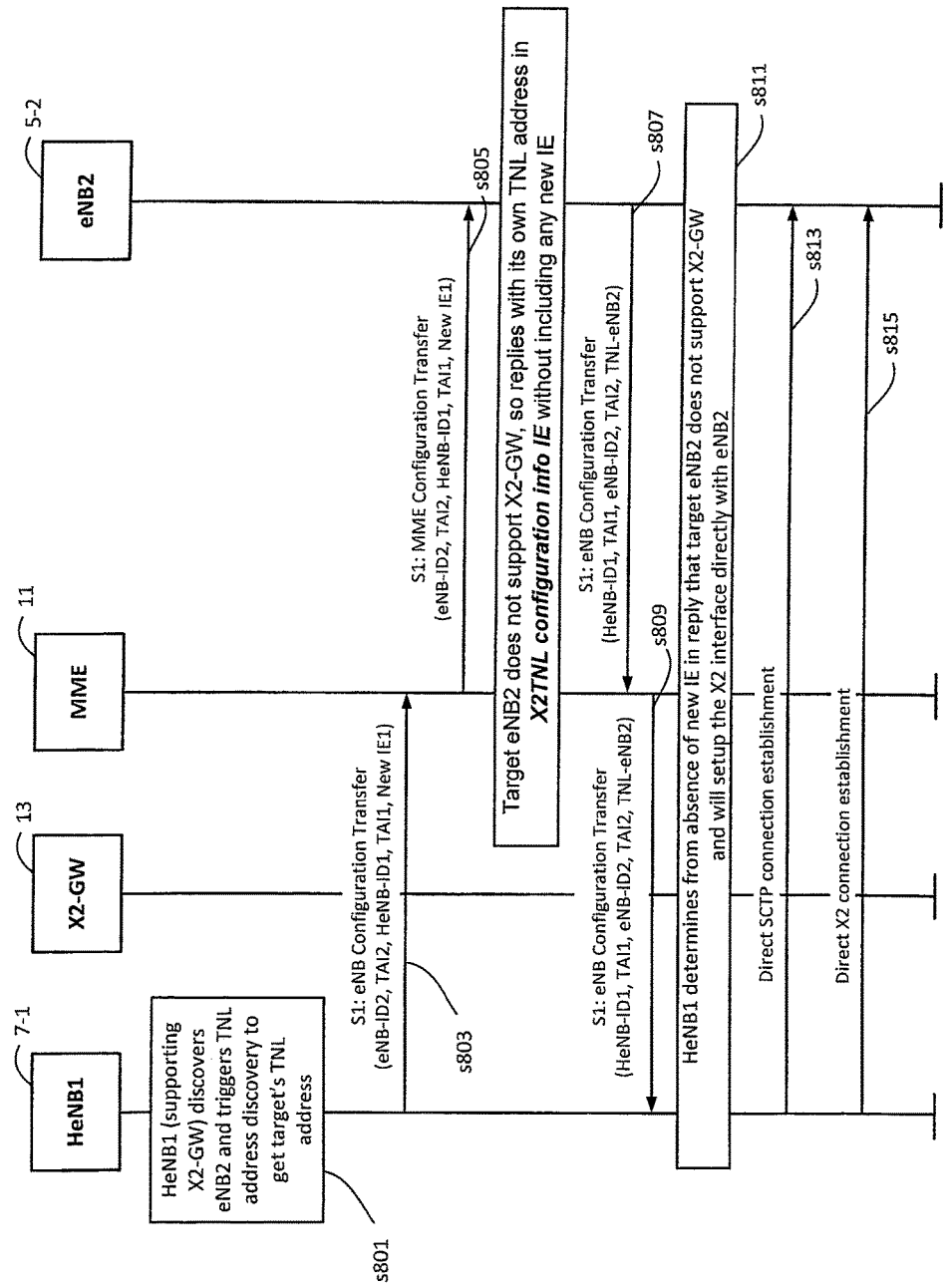
FIG. 8 is an exemplary timing diagram illustrating a method performed by components of the mobile telecommunication system of FIG. 1 whilst carrying out an embodiment of the invention.

FIG. 8 is a timing diagram illustrating the steps performed using this solution for Scenario #2 where the source is HeNB1 7-1 (which supports use of the X2-GW 13) and the target is eNB2 5-2 (which does not support use of the X2-GW 13). As shown in FIG. 8, at step s801 HeNB1 7-(discovers eNB2 5-2. At step s803, the HeNB1 7-1 initiates a TNL address discovery procedure by sending, to the MME 11, an S1 eNB Configuration Transfer message that includes the global eNB identifier (eNB-ID2) of eNB2 5-2 (as the intended recipient of the message) and its own global identifier (HeNB-ID1) as the message sender. The Configuration Transfer message also includes the Tracking Area Indicator (TAI2) for eNB2, the TAI for HeNB1 (TAI1) and a new Information element (IE1) that indicates that HeNB1 7-1 supports use of the X2-GW 13. The new IE1 may be a single bit flag whose value indicates support or non-support for the X2-GW 13. At step s805, the MME 11 sends the Configuration Transfer message to eNB1 5-1.

In response to receiving the Configuration Transfer message, the eNB2 5-1 ignores the new IE in the received Configuration Transfer message—as eNB2 is a legacy eNB and so does not know how to interpret this IE. Accordingly, eNB2 replies by sending, in step s807, a Configuration Transfer message back to the MME 11, identifying its own TNL address (TNL-eNB2). In step s809, the MME 11 sends the returned Configuration Transfer message to HeNB1 7-1. In step s811, HeNB2 determines from the absence of the new IE in the returned Configuration Transfer message that target eNB2 does not support use of the X2-GW 13. Accordingly, in step s813, the source HeNB1 uses the received TNL address for eNB2 to establish a direct SCTP connection with eNB2 and subsequent to that, in step s815, establishes a direct X2 connection with eNB2 over the established SCTP connection.

Please note that in Solution 1 (under any Scenario), if an eNB is involved in the X2 Setup then, based on the SCTP establishment and the RNL-ID details found in the new IE (e.g., IE3) pertaining to the eNB, the X2-GW has to create an entry in its mapping table for the RNL-ID-based forwarding.

Solution 2

This solution deals with the case where base stations register in advance with their designated X2-GW. It is principally concerned with Scenario #3 where one HeNB discovers another HeNB. However, it is also applicable to Scenario #1 and Scenario #2 if macro base stations (eNBs) also pre-register with a designated X2-GW.

Figure 9:
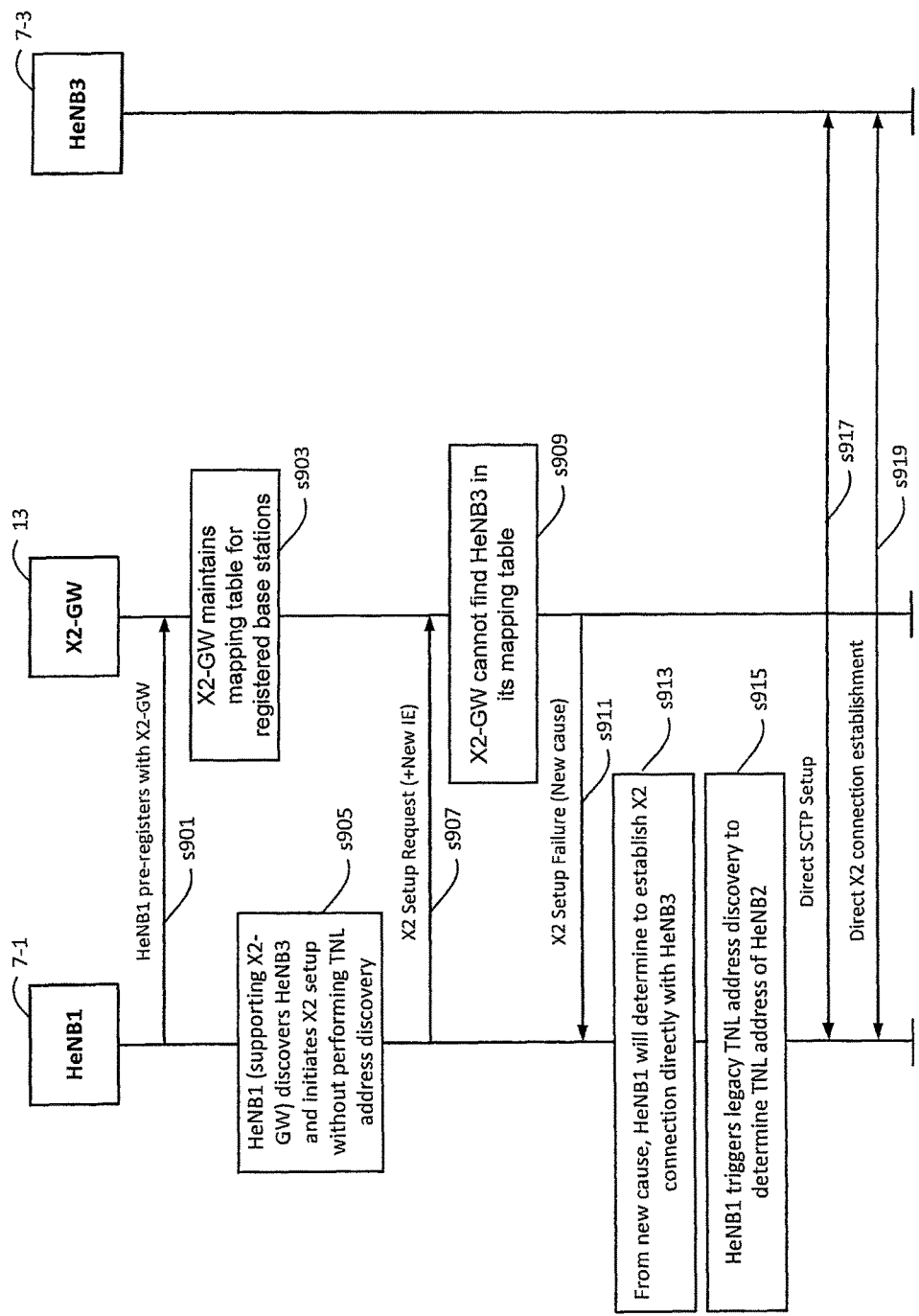
FIG. 9 is an exemplary timing diagram illustrating a method performed by components of the mobile telecommunication system of FIG. 1 whilst carrying out an embodiment of the invention.

FIG. 9 is a timing diagram for Scenario #3, where source HeNB1 7-1 (which supports use of X2-GW 13) identifies target HeNB3 7-3 (which does not support use of X2-GW 13). As shown, in step s901, source HeNB1 pre-registers with X2-GW 13. This may be part of its power up sequence when HeNB1 is powered up, reset or reconfigured. At step s903, the X2-GW 13 updates the data it maintains in its mapping table to identify the new SCTP connection it has just established with HeNB1. In step s905, source HeNB1 discovers target HeNB3 and initiates an X2 setup procedure by sending, in step s907, an X2 Setup Request message to the X2-GW 13 without performing a TNL address discovery procedure. The X2 Setup Request message includes a new IE that identifies the RNL-ID of the target base station (HeNB3), which HeNB1 obtains in step s905 when it discovered HeNB3. The X2-GW 13 uses the received RNL-ID for HeNB3 to try to locate a corresponding entry in its mapping table. If the X2-GW 13 finds a corresponding entry in its mapping table, then the X2-GW 13 forwards the received X2 Setup Request to HeNB3 over the SCTP connection it has with HeNB3 and will return any X2 Setup Response messages received back from HeNB3 to HeNB1, in order to establish the X2 connection between HeNB1 and HeNB3.

However, in this example, HeNB3 is not registered with X2-GW 13 and so in step S909, the X2-GW 13 does not find a corresponding entry in its mapping table. This may be because HeNB3 is a legacy device or because HeNB3 is registered with another X2-GW (not shown) or because HeNB3 is configured not to operate via any X2-GW. As a result, in step s911, X2-GW 13 sends an X2 Setup Failure message with a new cause of failure indicating that the target HeNB3 does not support operation with X2-GW 13. In step s913, HeNB1 receives the X2 Setup Failure message and determines from the new cause that it will have to establish an X2 connection directly with HeNB3. Accordingly, in step s915, HeNB1 triggers a conventional TNL discovery process to determine the TNL address of HeNB3, so that an SCTP connection can be established between HeNB1 and HeNB3 in step s917 and so that a direct X2 connection can be established between HeNB1 and HeNB3 in step s919.

Solution 3

This solution also deals with the case where base stations register in advance with their designated X2-GW. It is principally concerned with Scenario #3 where one HeNB discovers another HeNB. However, it is also applicable to Scenario #1 and Scenario #2 if macro base stations (eNBs) also pre-register with a designated X2-GW.

Figure 10:
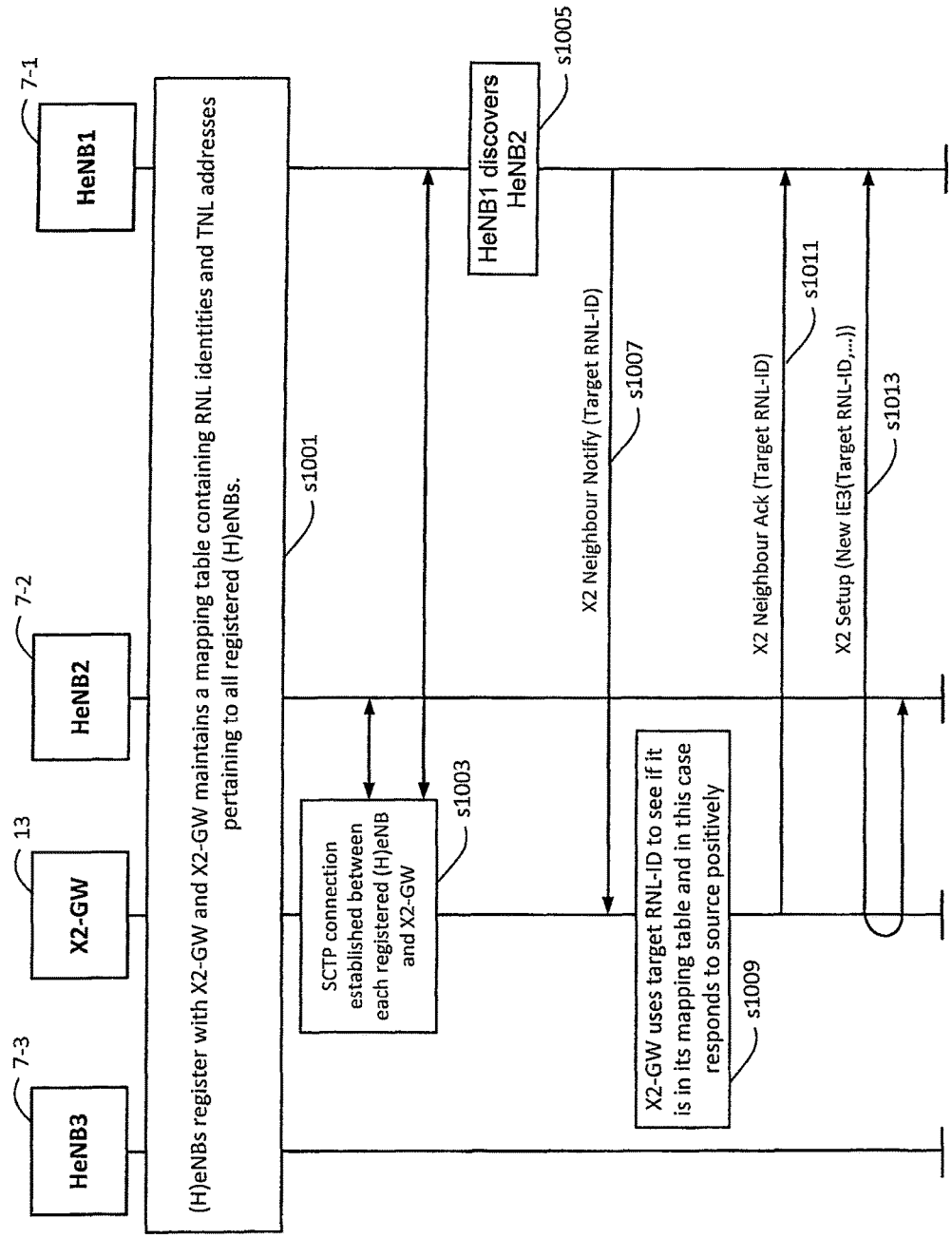
FIG. 10 is an exemplary timing diagram illustrating a method performed by components of the mobile telecommunication system of FIG. 1 whilst carrying out an embodiment of the invention.

FIG. 10 is a timing diagram for Scenario #3, where source HeNB1 (which supports use of X2-GW 13) identifies target HeNB2 7-2 (which does support use of X2-GW 13). As shown, in step s1001, HeNBs (and if applicable eNBs) pre-register with their designated X2-GW (in this case X2-GW 13). This may be part of each base station's power up sequence or when the base station is reset or reconfigured—and so will not be defined as a single step performed at a single point in time. In step s1003, an SCTP connection is established between each registered base station and the X2-GW 13. As the establishment of each SCTP connection will be performed at the time that the corresponding base station registers with the X2-GW 13, this step will also not be a single step performed at a single time. At step s1005, source HeNB1 discovers target HeNB2. In response, source HeNB1 sends, in step s1007, a new X2 Neighbour Notify message to the X2-GW 13, which message includes a new IE containing the RNL-ID of target base station (HeNB2). In step s1009 X2-GW 13 uses the target RNL-ID contained in the new X2 Neighbour Notify message to check if this RNL-ID is already contained in its mapping table. In this case, the RNL-ID for HeNB2 is in the mapping table (because HeNB2 is registered with X2-GW 13) and accordingly, in step s1011, the X2-GW 13 sends an X2 Neighbour ACK message that positively acknowledges to the source Base station (HeNB1) that the target base station (HeNB2) is registered with X2-GW 13—and so an X2 connection can be established via X2-GW 13. Accordingly, in response to receiving this positive acknowledgement, source base station (HeNB1) initiates the X2 setup procedure via the X2-GW 13 in step s1013. As before, this will involve HeNB1 sending to the X2-GW 13 an X2 Setup Request message. The X2 Setup Request message will include a new IE (e.g. IE3) that identifies the RNL-ID of the target base station (HeNB2), which HeNB1 obtained in step s1005 when it discovered HeNB2. In response to receiving this X2 Setup Request message, the X2-GW 13 retrieves the TNL address for the target base station (HeNB2) from the target RNL-ID contained in the X2 Setup request message and its stored mapping table and then forwards the X2 Setup Request message to this target (HeNB2) using the retrieved TNL address. As before, the target base station (HeNB2) determines the identity of the source base station (HeNB1) from the RNL-ID of the source base station that is contained within the X2 Setup Request and will return an X2 Setup Response message back to HeNB1 via X2-GW 13 to set up the X2 connection between HeNB1 and HeNB2.

As can be seen from the above description, the source base station (HeNB1) is able to establish an X2 connection with the newly discovered target base station (HeNB2) without performing a conventional S1 TNL address discovery procedure (thereby saving on processing load within the core network).

Figure 11:
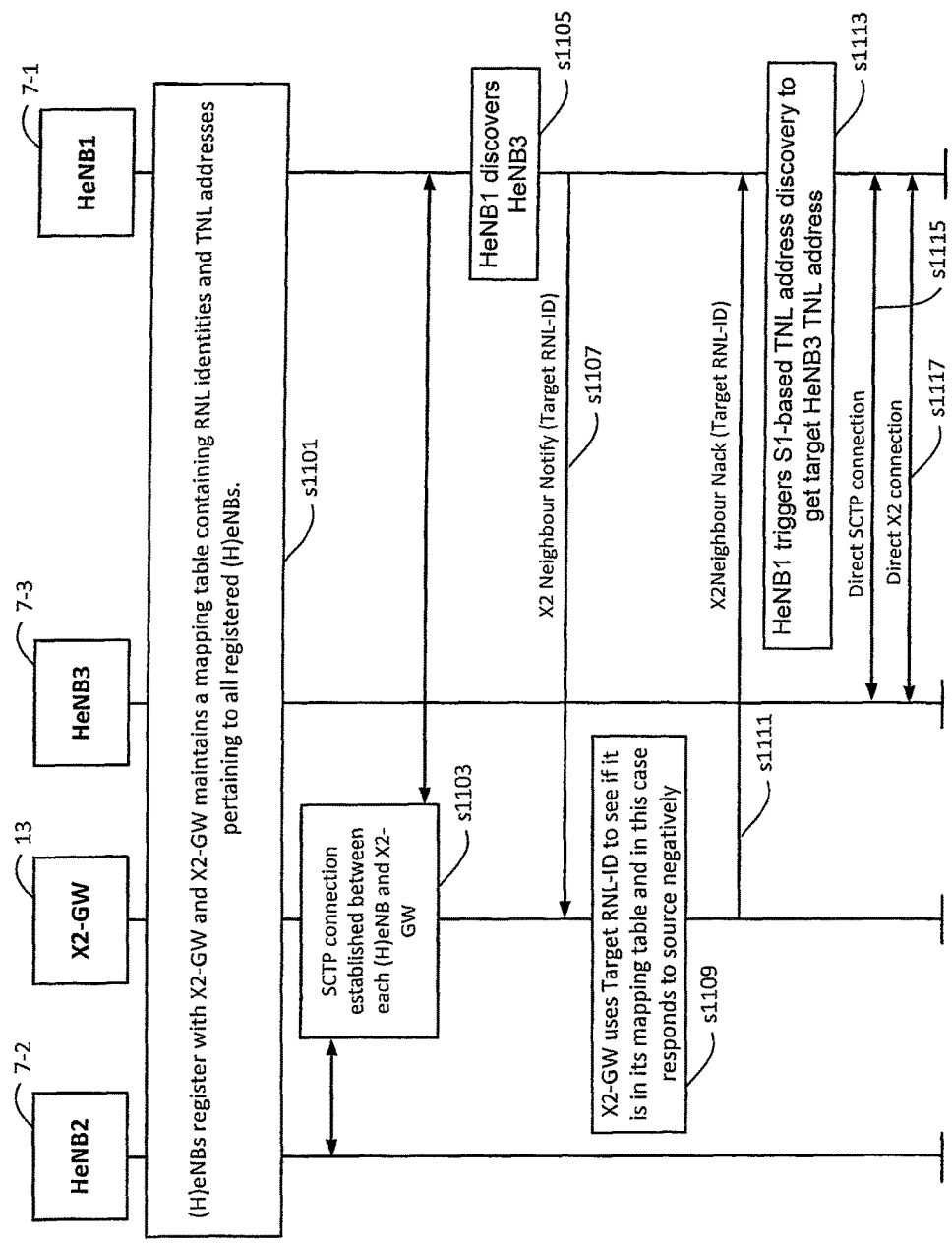
FIG. 11 is an exemplary timing diagram illustrating a method performed by components of the mobile telecommunication system of FIG. 1 whilst carrying out an embodiment of the invention.

FIG. 11 is a timing diagram illustrating the situation when the target base station (in this example HeNB3) does not support use of X2-GW 13. Steps s1101 to s1107 correspond to steps s1001 to s1007 described above for FIG. 10, and so a description of these steps will be omitted. In step S1109, the X2-GW 13 is not able to find the RNL-ID for HeNB3, because HeNB3 has not registered with X2-GW 13. Therefore, in step s1111, X2-GW 13 sends an X2 Neighbour Nack (negative-acknowledgement) message containing the target RNL address of HeNB3, back to HeNB1 indicating to HeNB1 that the target base station (HeNB3) does not support use of X2-GW 13. Accordingly, in step s1113 HeNB1 triggers a conventional S1 TNL address discovery procedure to determine the TNL address for target base station HeNB3, so that it can then establish a direct SCTP connection with HeNB3 in step s1115 and then establish a direct X2 connection with HeNB3 in step s1117.

Solution 4

This solution is similar to solution 1, in that X2-GW information is exchanged between the source base station and the target base station and a new Information Element (IE) is added in the X2 setup request message to allow the X2-GW 13 to establish the X2 connection between the source and target base stations. This solution is applicable to Scenario #1 and Scenario #2.

Solution 4 (Scenario #1)

Figure 12:
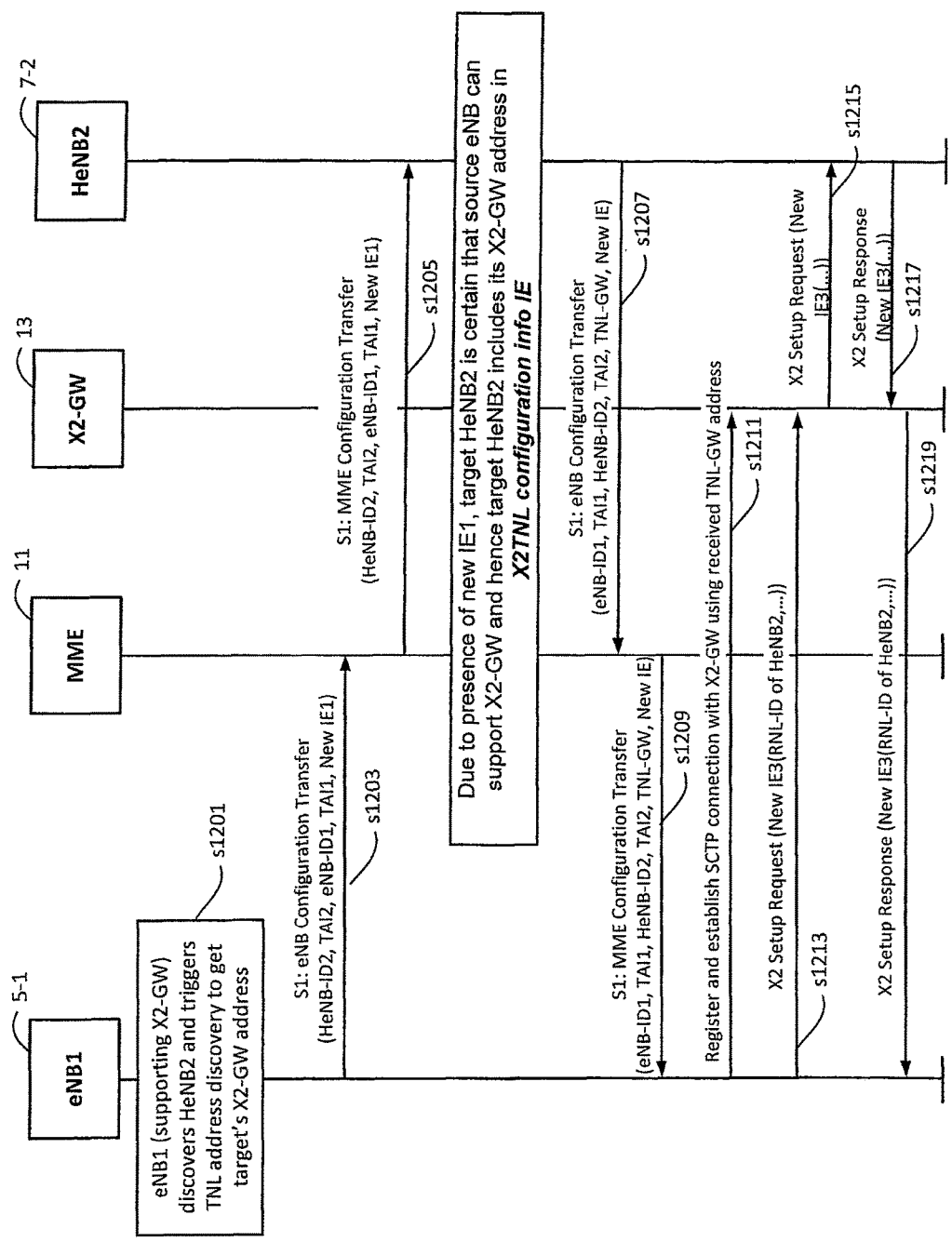
FIG. 12 is an exemplary timing diagram illustrating a method performed by components of the mobile telecommunication system of FIG. 1 whilst carrying out an embodiment of the invention.

FIG. 12 is a timing diagram illustrating the steps performed using this solution for Scenario #1 where the source is eNB1 5-1 (which supports use of the X2-GW 13) and the target is HeNB2 7-2 (which also supports use of the X2-GW 13). Steps s1201 to s1209 and steps s1213 and s1219 correspond to steps s501 to s509 and steps s513 and s519 described above with reference to FIG. 5, and a further description of these steps will therefore be omitted. The difference between this solution and solution 1 is that source eNB1 also registers with X2-GW 13 in step s1211 using the TNL address (TNL-GW) received from the target base station HeNB2. The advantage of this embodiment over Solution 1 discussed above is that it simplifies the operation of the X2-GW 13, such that it will carry out the same network connection process regardless of whether the base station is an eNB or an HeNB. With Solution 1 described above, the X2-GW has to support different procedures depending on whether the base station is an HeNB or an eNB. In particular, with solution 1 when there is no existing network connection between the X2-GW 13 and the target eNB, the X2-GW has to create the mapping entries in its mapping table using the information contained in the X2 Setup Request message (received from the source base station) and then try to establish the network connection with the eNB. With Solution 4 all the mapping table entries will have been created before the X2-GW receives the X2 Setup Request message.

Solution 4 (Scenario #2)

Figure 13:
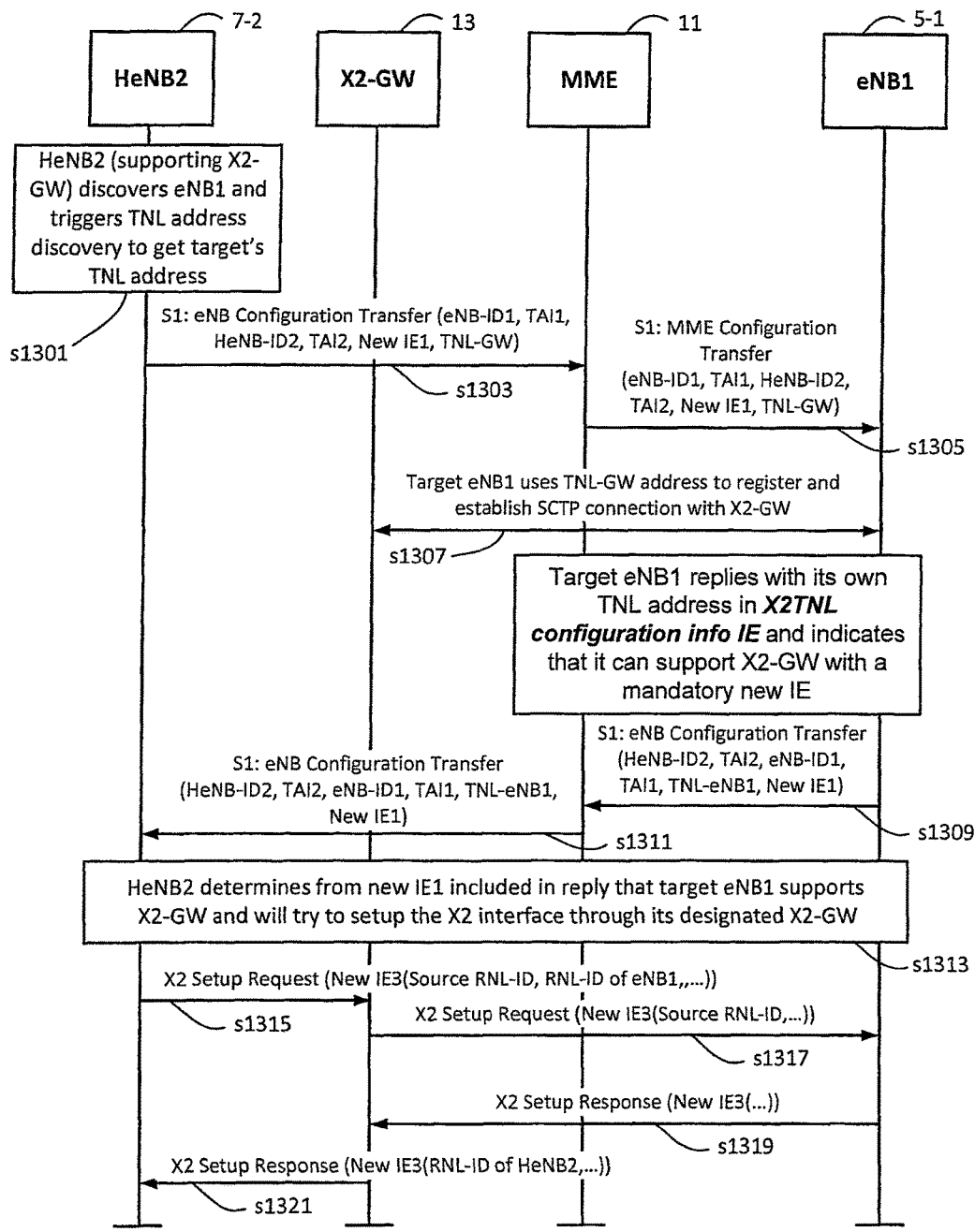
FIG. 13 is an exemplary timing diagram illustrating a method performed by components of the mobile telecommunication system of FIG. 1 whilst carrying out an embodiment of the invention.

FIG. 13 is a timing diagram illustrating the steps performed using this solution for Scenario #2 where the source is HeNB2 7-2 (which supports use of the X2-GW 13) and the target is eNB1 5-1 (which also supports use of the X2-GW 13). In step S1301, the source HeNB2 discovers target eNB1. At step s1303, the HeNB2 7-2 initiates a TNL address discovery procedure by sending, to the MME 11, an S1 eNB Configuration Transfer message that includes the global eNB identifier (eNB-ID1) of eNB1 5-1 (as the intended recipient of the message) and its own address (HeNB-ID2) as the message sender. The Configuration Transfer message also includes the Tracking Area Indicator (TAIL) for eNB1, the TAI for HeNB2 (TAI2) and a new Information element (IE1) that indicates that HeNB2 7-2 supports use of the X2-GW 13—this may be a single bit flag whose value indicates support or non-support for the X2-GW 13. In this embodiment, HeNB2 also includes, within the S1 eNB Configuration Transfer message, the TNL address of its designated X2-GW 13 (TNL-GW) using the existing X2 TNL Configuration Info IE. At step s1305, the MME 11 relays the Configuration Transfer message to the eNB1 5-1.

If the target base station (eNB1) also supports operation through X2-GW 13 (as it does in this case), then in response to receiving this Configuration Transfer message, the eNB1 uses the X2-GW TNL address (TNL-GW) contained within the received message to register itself with the X2-GW 13 in step s1307 (please note that Step S1307 can take place at any time between S1305 and S1315). Target eNB1 also replies to the Configuration transfer message by sending, in step s1309, a Configuration Transfer message back to MME 11, identifying its own TNL address (TNL-eNB1) and including a new IE (IE1) that indicates that the target eNB1 5-1 supports use of the X2-GW 13. In step s1311, the MME 11 relays the returned Configuration Transfer message to HeNB2 7-2. In step s1313, the HeNB2 determines from the new IE1 in the returned Configuration Transfer message that the target eNB1 supports use of the X2-GW 13 and therefore, in accordance with this solution, will have registered with X2-GW 13. Accordingly, in step s1315, the source HeNB2 sends (over the SCTP connection pre-established between HeNB2 and X2-GW 13) an X2 Setup Request message to the X2-GW 13, which message includes a new IE (IE3) containing the RNL-ID for eNB1. Unlike in Solution 1, there is no need to send the TNL address of eNB1 in this message—as eNB1 should have registered with the X2-GW 13 in step s1307. In step S1317, the X2-GW 13 uses the RNL-ID for eNB1 to look up its mapping table to identify the corresponding TNL address for eNB1 and then forwards the X2 Setup Request message received from HeNB2 to eNB1 using the retrieved TNL address. In response to receiving the X2 Setup Request message, the target base station (eNB1) determines the identity of the source base station (HeNB2) from the RNL-ID of the source base station contained within the X2 Setup Request message and sends, in step s1319, an X2 Setup Response message back to the X2-GW 13. This X2 Setup Response message also includes the new IE (IE4) that identifies the RNL-ID of the intended recipient (HeNB2) for the message and its own RNL-ID. The X2-GW 13 uses the intended recipient's RNL-ID to identify the corresponding SCTP connection over which the message should be forwarded. In this case the message is forwarded to HeNB2 in step s1321. As before, in all subsequent X2 AP messages sent between eNB1 and HeNB2 via the X2-GW 13, the sender includes (for example in new IE4 or new IE5) the RNL-ID of the intended recipient together with its own RNL-ID so that the X2-GW 13 can use the intended recipient's RNL-ID to route the message to the correct base station over the correct SCTP connection and so that the recipient knows the identity of the sending base station.

In the above embodiments, a number of new Information Elements were used in messages transmitted by the different base stations. Exemplary information elements that can be used are given below in the following tables:

New IE1 that can be added in the X2 TNL Configuration Info of TS 36.413 V11.3.0

| IE/Group Name | Presence | Range | IE type and reference | Semantics description |
|---|---|---|---|---|
| eNB X2 Transport Layer Addresses | | 1 to <maxnoofeNBX2TLAs> | | |
| >Transport Layer Address | M | | 9.2.2.1 | Transport Layer Addresses for X2 SCTP end-point. |
| — | | — | — | — |
| X2-GW Support | M | Boolean (TRUE, FALSE) | | Support indication of X2-GW |

| Range bound | Explanation |
| --- | --- |
| maxnoofeNBX2TLAs | Maximum no. of eNB X2 Transport Layer Addresses for an SCTP end-point. Value is 2. |
| maxnoofeNBX2ExtTLAs | Maximum no. of eNB X2 Extended Transport Layer Addresses in the message. Value is 16. |

-continued

| Range bound | Explanation |
| --- | --- |
| maxnoofeNBX2GTPTLAs | Maximum no. of eNB X2 GTP Transport Layer Addresses for an GTP end-point in the message. Value is 16. |

In solution 1 a new IE (IE2) was added to the X2 Setup Request message sent to the X2-GW. The table below illustrates an example of what IE2 might contain. This new IE may be added to Section 9.1.2.3 of TS 36.423 V11.4.0.

| IE/Group Name | Presence | Range | IE type and reference | Semantics description | Criticality | Assigned Criticality |
| --- | --- | --- | --- | --- | --- | --- |
| Message Type | M | | 9.2.13 | | YES | reject |
| Global eNB ID | M | | 9.2.22 | | YES | reject |
| Served Cells | | 1 .. <maxCellineNB> | | Complete list of cells served by the eNB | YES | reject |
| >Served Cell Information | M | | 9.2.8 | | — | — |
| >Neighbour Information >>ECGI >>PCI >>EARFCN >>TAC Target Details | | 0 .. <maxnoofNeighbours> | | | — | — |
| >Global eNB ID | M | | 9.2.22 | | YES | reject |
| >eNB X2 Transport Layer Addresses | O | 1.. <maxnoofeNBX2TLAs> | | | | |
| >>Transport Layer Address | M | | 9.2.2.1 | Transport Layer Addresses for X2 SCTP end-point. | | |
| >eNB X2 Extended Transport Layer Addresses | | 0.. <maxnoofeNBX2ExtTLAs> | | | | |
| >>IP-Sec Transport Layer Address | O | | 9.2.2.1 | Transport Layer Addresses for IP-Sec end-point. | | |
| >>eNB GTP Transport Layer Addresses | | 0.. <maxnoofeNBX2GTPTLAs> | | | | |
| >>>GTP Transport Layer Address | M | | 9.2.2.1 | GTP Transport Layer Addresses for GTP end-points (used for data forwarding over X2). | | |

New IE3 that can be used in Solutions 1, 3 and 4 discussed above:

| IE/Group Name | Presence | Range | IE type and reference | Semantics description | Criticality | Assigned Criticality |
| --- | --- | --- | --- | --- | --- | --- |
| Message Type --- Target Details | M | | 9.2.13 | | YES | reject |
| >Global eNB ID | M | | 9.2.22 | | YES | reject |

New IE4 that can be added to X2AP messages in general

| IE/Group Name | Presence | Range | IE type and reference | Semantics description | Criticality | Assigned Criticality |
|---|---|---|---|---|---|---|
| Message Type Source Details | M | | 9.2.13 | | YES | reject |
| >Global eNB ID Target Details | O | | 9.2.22 | | YES | Ignore |
| >Global eNB ID | M | | 9.2.22 | | YES | reject |

New IE5 that may be added to X2AP messages in General.

| IE/Group Name | Presence | Range | IE type and reference | Semantics description | Criticality | Assigned Criticality |
|---|---|---|---|---|---|---|
| Message Type Source Details | M | | 9.2.13 | | YES | reject |
| >Global eNB ID Target Details | O | | 9.2.22 | | YES | Ignore |
| >Global eNB ID | M | | 9.2.22 | | YES | reject |
| >eNB X2 Transport Layer Addresses | O | 1.. <maxnoofeNBX2TLAs> | | | | |
| >>Transport Layer Address | M | | 9.2.2.1 | Transport Layer Addresses for X2 SCTP end-point. | | |
| >eNB X2 Extended Transport Layer Addresses | | 0.. <maxnoofeNBX2ExtTLAs> | | | | |
| >>IP-Sec Transport Layer Address | O | | 9.2.2.1 | Transport Layer Addresses for IP-Sec end-point. | | |
| >>eNB GTP Transport Layer Addresses | | 0.. <maxnoofeNBX2GTPTLAs> | | | | |
| >>>GTP Transport Layer Address | M | | 9.2.2.1 | GTP Transport Layer Addresses for GTP end-points (used for data forwarding over X2). | | |

In solution 3 an X2 setup failure message was sent with a new cause value to indicate that the target base station does not support use of the X2-GW 13. The table below gives details of the changes to Section 9.2.6 of TS 36.423 that will be needed to accommodate this new cause value.

| IE/Group Name | Presence | Range | IE Type and Reference | Semantics Description |
|---|---|---|---|---|
| CHOICE Cause Group >Radio Network Layer | M | | | |
| >>Radio Network Layer Cause | M | | ENUMERATED ( Handover Desirable for Radio Reasons, Time Critical Handover, Resource Optimisation Handover, | |

| IE/Group Name | Presence | Range | IE Type and Reference | Semantics Description |
|---|---|---|---|---|
| | | | Reduce Load in Serving Cell, Partial Handover, , . . . , ) | |
| >Transport Layer | | | | |
| >>Transport Layer Cause | M | | ENUMERATED (Transport Resource Unavailable, Unspecified, No X2-GW Support for target . . . ) | |
| >Protocol | | | | |
| >>Protocol Cause | M | | ENUMERATED (Transfer Syntax Error, ), . . . ) | |
| >Misc | | | | |
| >>Miscellaneous Cause | M | | ENUMERATED (Control Processing Overload, , . . . ) | |

The presence field of IE1, IE2, IE3, IE4 and IE5 can take either value—i.e., Optional (O) or mandatory (M). Similarly, the Assigned Criticality field of IE2, IE3, IE4 and IE5 can again take either value—i.e., reject or ignore.

Modifications and Alternatives

A number of detailed embodiments have been described above. As those skilled in the art will appreciate, a number of modifications and alternatives can be made to the above embodiments whilst still benefiting from the inventions embodied therein.

In the above embodiments, a mobile telephone based telecommunications system was described. As those skilled in the art will appreciate, the signalling techniques described in the present application can be employed in other communications systems. Other communications nodes or devices may include user devices such as, for example, personal digital assistants, laptop computers, web browsers, etc.

In the above embodiments, (home) base stations and the X2-GW are described as being addressed using their respective TNL addresses. As those skilled in the art will appreciate, other types of network addresses may be used instead, e.g. an Internet Protocol (IP) address.

It will be appreciated that an X2 communication link between two (home) base stations may be set up either on an end-to-end or a hop-by-hop basis through the X2-GW. The embodiments described above assume a hop-by-hop operation, where an X2-GW terminates both SCTP and X2 connections and hence maintains states for each X2 Setup (i.e. which base station is connected to which other base station). In the case of end-to-end operation, the X2-GW operates more like an RNL level router, in which the X2 connection is terminated at the (H)eNBs and the X2-GW simply relays the incoming X2AP message based on the target identity/address.

In the above embodiments, a base station that sent a message to another base station through the X2-GW included the RNL address of the intended recipient of the message. This information allowed the X2-GW to identify the correct SCTP connection over which it should send the message to reach the desired recipient. The message may also include the RNL address of the sending base station in some situations. This allowed the base station that receives the message from the X2-GW to identify the sender of the message. As those skilled in the art will appreciate, it is not essential for the sending base station to include its own RNL ID. The X2-GW could add information in the forwarded message that identifies the sending base station to the recipient base station.

In the above embodiment, it was assumed that there is one TNL address and one RNL-ID for a base station. In practice, a base station will use multiple TNL Addresses for instance for the purpose of multi-homing, added security etc.

In the embodiments described above, the base stations each include transceiver circuitry. Typically this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to the base station or the X2-GW or to the mobile telephone as a signal over a computer network, or on a recording medium. Further, the functionality performed by part or all of this software may be performed using one or more dedicated hardware circuits. However, the use of software modules is preferred as it facilitates the updating of the base stations, gateways, and the mobile telephones in order to update their functionalities.

Various other modifications will be apparent to those skilled in the art and will not be described in further detail here.

This application is based upon and claims the benefit of priority from United Kingdom patent application No. 1309970.0, filed on Jun. 4, 2013, the disclosure of which is incorporated herein in its entirety by reference.

The invention claimed is:

1. A source base station comprising:
at least one memory configured to store instructions;
at least one processor configured to execute the instructions to:
send, in an X2AP message towards an X2 gateway (X2 GW), a global eNB identifier (Global eNB ID) for use by the X2 GW in mapping to a transport network layer (TNL) address of the source base station; and
send, towards a target base station, an eNB configuration transfer message for discovery of a TNL address relating to the target base station; and include an address of the X2 GW, in said eNB configuration transfer message, when said source base station has an X2 GW support capability.

* * * * *

UNITED STATES PATENT AND TRADEMARK OFFICE
CERTIFICATE OF CORRECTION

PATENT NO. : 10,390,376 B2
APPLICATION NO. : 16/001169
DATED : August 20, 2019
INVENTOR(S) : Kawaguchi et al.

Page 1 of 1

It is certified that error appears in the above-identified patent and that said Letters Patent is hereby corrected as shown below:

On the Title Page

Under item (*) Notice:
Add: This patent is subject to a Terminal Disclaimer

Signed and Sealed this
Twenty-fourth Day of March, 2020

Andrei Iancu
*Director of the United States Patent and Trademark Office*